(12) United States Patent
Hiramatsu et al.

(10) Patent No.: US 11,912,275 B2
(45) Date of Patent: Feb. 27, 2024

(54) AUTONOMOUS DRIVING CONTROL METHOD AND AUTONOMOUS DRIVING CONTROL DEVICE

(71) Applicants: Nissan Motor Co., Ltd., Yokohama (JP); Renault S.A.S., Boulogne-Billancourt (FR)

(72) Inventors: Machiko Hiramatsu, Kanagawa (JP); Yuji Takada, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/035,885

(22) PCT Filed: Nov. 16, 2020

(86) PCT No.: PCT/IB2020/000957
§ 371 (c)(1),
(2) Date: May 8, 2023

(87) PCT Pub. No.: WO2022/101653
PCT Pub. Date: May 19, 2022

(65) Prior Publication Data
US 2023/0347891 A1    Nov. 2, 2023

(51) Int. Cl.
*B60W 30/16* (2020.01)
*B60W 30/18* (2012.01)
*B60W 60/00* (2020.01)

(52) U.S. Cl.
CPC ...... *B60W 30/16* (2013.01); *B60W 30/18154* (2013.01); *B60W 30/18159* (2020.02);
(Continued)

(58) Field of Classification Search
CPC .......... B60W 30/16; B60W 30/18154; B60W 30/18159
See application file for complete search history.

(56) References Cited

U.S. PATENT DOCUMENTS

2019/0389465 A1* 12/2019 Ogino ............. B60W 30/18009
2020/0159234 A1* 5/2020 Ohara ............. B60W 30/18154
2021/0276551 A1* 9/2021 Inoue ................. B60W 60/001

FOREIGN PATENT DOCUMENTS

DE    102014220685 A1    4/2016
JP    2008087618 A       4/2008
(Continued)

OTHER PUBLICATIONS

English Translation of JP-2015147525-A.*

*Primary Examiner* — Anshul Sood
(74) *Attorney, Agent, or Firm* — Young Basile Hanlon & MacFarlane, P.C.

(57) ABSTRACT

An autonomous driving control method for stopping a host vehicle such that an inter-vehicle distance to a preceding vehicle is a predetermined at-stopping inter-vehicle distance includes: executing first stop control of setting the at-stopping inter-vehicle distance to a first at-stopping inter-vehicle distance shorter than a predetermined basic at-stopping inter-vehicle distance when a stop position of the host vehicle is within a forward stop limit area set in front of a crossing lane, and/or executing second stop control of setting the at-stopping inter-vehicle distance to a second at-stopping inter-vehicle distance longer than the basic at-stopping inter-vehicle distance when the stop position of the host vehicle is within a rearward stop limit area set behind the crossing lane.

13 Claims, 15 Drawing Sheets

(52) U.S. Cl.
CPC ....... *B60W 60/001* (2020.02); *B60W 2552/53* (2020.02); *B60W 2554/4041* (2020.02); *B60W 2754/30* (2020.02)

(56) References Cited

FOREIGN PATENT DOCUMENTS

| | | | |
|---|---|---|---|
| JP | 2015147525 A | * | 8/2015 |
| JP | 2015147525 A | | 8/2015 |
| WO | 2017038173 A1 | | 3/2017 |
| WO | 2018173175 A1 | | 9/2018 |

* cited by examiner

AUTONOMOUS DRIVING CONTROL METHOD AND AUTONOMOUS DRIVING CONTROL DEVICE

TECHNICAL FIELD

The present invention relates to an autonomous driving control method and an autonomous driving control device.

BACKGROUND ART

JP2015-147525A proposes, in order not to stop a host vehicle in an intersection, driving support control in which an inter-vehicle distance to a preceding vehicle is set to be longer than an intersection road length (distance from an intersection entrance to an intersection exit) when an arrival distance to the intersection is equal to or less than a predetermined value.

SUMMARY OF INVENTION

When stopping the host vehicle based on the driving support control in JP2015-147525A, it is assumed that there is a possibility that, depending on a stop position, other vehicles are prevented from departing from the intersection and the other vehicles are left in the intersection.

In view of such circumstances, an object of the present invention is to provide an autonomous driving control method and an autonomous driving control device that can suppress other vehicles from being left in an intersection, in particular, in a crossing lane in which a traveling road, a line, a sidewalk, or the like intersects with a traveling road on which a host vehicle travels.

According to an aspect of the present invention, an autonomous driving control method for stopping a host vehicle such that an inter-vehicle distance to a preceding vehicle is a predetermined at-stopping inter-vehicle distance is provided. The method includes: executing first stop control of setting the at-stopping inter-vehicle distance to a first at-stopping inter-vehicle distance shorter than a predetermined basic at-stopping inter-vehicle distance when a stop position of the host vehicle is within a forward stop limit area set in front of a crossing lane, and/or executing second stop control of setting the at-stopping inter-vehicle distance to a second at-stopping inter-vehicle distance longer than the basic at-stopping inter-vehicle distance when the stop position of the host vehicle is within a rearward stop limit area set behind the crossing lane.

DESCRIPTION OF EMBODIMENTS

Hereinafter, embodiments of the present invention will be described with reference to the drawings and the like. The term "autonomous driving" in the present description is a concept that includes both operation control of a vehicle that supports a part of a driving operation by a driver of the vehicle (autonomous driving level=1 to 4), and operation control of the vehicle without an operation by the driver (autonomous driving level=5). In addition, the term "forward" in the present description means a forward in a traveling direction of a vehicle (hereinafter referred to as a "host vehicle α") on which autonomous driving control methods according to the embodiments are to be executed (traveling direction designated by a traveling lane L1 of the host vehicle α). Further, the term "rearward" means a rearward in the traveling direction of the host vehicle α on which the autonomous driving control methods according to the embodiments are to be executed. Therefore, in front of or behind a crossing lane Ct, which will be described later, is not universally determined, and is appropriately determined according to the traveling direction of the host vehicle α (the host vehicle α is traveling in the traveling lane L1 or in a lane facing the traveling lane L1).

[System Configuration Common to Embodiments]

Figure 1:
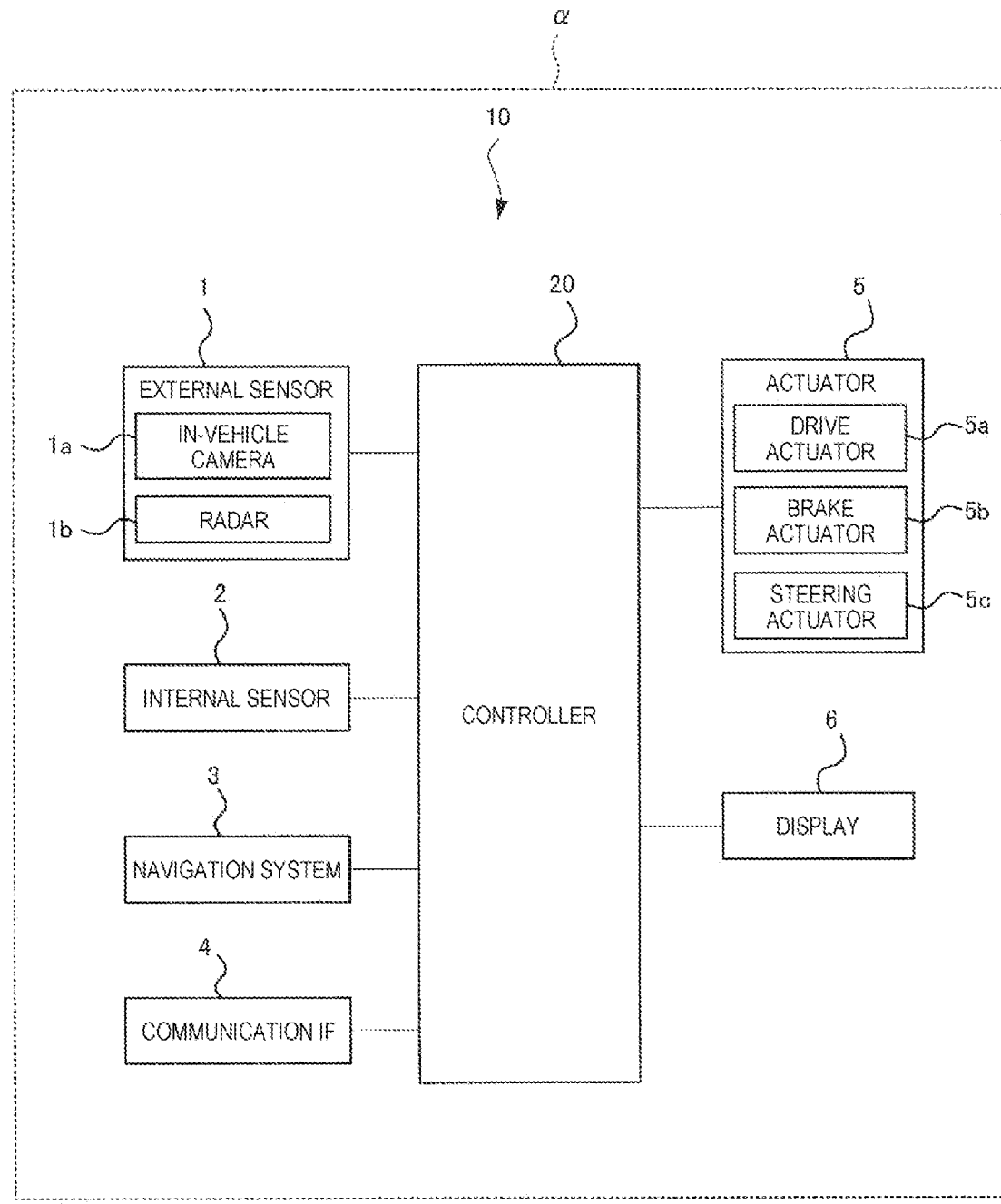
FIG. 1 is a block diagram illustrating a configuration of a vehicle control system commonly applied to embodiments of the present invention.

FIG. 1 is a diagram illustrating a configuration of a vehicle control system 10 commonly applied to the embodiments.

As illustrated, the vehicle control system 10 includes an external sensor 1, an internal sensor 2, a navigation system 3, a communication interface 4, an actuator 5, a display 6, and a controller 20. The vehicle control system 10 is mounted on a vehicle (hereinafter referred to as a "host vehicle α") on which an autonomous driving control method according to the present embodiment is to be executed.

The external sensor 1 is a detection device that detects a surrounding situation of the host vehicle α. In particular, the external sensor 1 includes an in-vehicle camera 1a and a radar 1b.

The in-vehicle camera 1a is an imaging device that images a surrounding of the host vehicle α. The in-vehicle camera 1a is provided, for example, on a vehicle interior side of a windshield of the host vehicle α. The in-vehicle camera 1a includes a monocular camera or a stereo camera. The in-vehicle camera 1a outputs an imaged surrounding image of the host vehicle α to the controller 20.

The radar 1b detects an object such as another vehicle present outside the host vehicle α using radio waves. The radio waves are, for example, millimeter waves. More specifically, the radar 1b transmits radio waves to the surrounding of the host vehicle α, receives radio waves reflected by an object, and detects the object. The radar 1b can output, for example, a distance or a direction to the object as object information (in particular, surrounding vehicle information). The radar 1b outputs detected surrounding vehicle detection data to the controller 20. Instead of or in addition to the radar 1b, laser imaging detection and ranging (LIDER) that detects the object outside the host vehicle α using light may be mounted as the external sensor 1.

The internal sensor 2 is a detector that detects various types of information according to a traveling state of the host vehicle α. For example, the internal sensor 2 includes a vehicle speed sensor that detects a vehicle speed of the host vehicle α (hereinafter also referred to as a "host vehicle speed Vα"), an acceleration sensor that detects an acceleration of the host vehicle α, and the like.

The navigation system 3 is a device that obtains traveling route information to a destination set on a map by an occupant such as a driver of the host vehicle α, and outputs the traveling route information to the controller 20. More specifically, the navigation system 3 obtains a traveling route set for the host vehicle α as target route information based on position information of the host vehicle α measured by a global positioning system (GPS) and map information in a predetermined map database. The map information may include an HD map (dynamic map) including information on road conditions such as the number of lanes or a shoulder size, traveling amount of other vehicles, presence or absence of an obstacle, or the like, in addition to information on a travelable path.

The communication interface 4 includes various communication protocols for receiving information necessary for traveling of the host vehicle α and information pointed out by the occupant from a predetermined external server and transmitting the information to the controller 20. The communication interface 4 is implemented by, for example, vehicle to vehicle (V2V) that enables communication between the controller 20 and another vehicle (vehicle-to-vehicle communication), vehicle to infrastructure (V2I) that enables communication between the controller and infrastructure equipment such as a traffic light (road-to-vehicle communication), and vehicle to network (V2N) that enables communication between the controller 20 and a predetermined external server (including a cloud).

The actuator 5 is a device for operating the host vehicle α to a traveling state according to a command from the controller 20. In particular, the actuator 5 includes a drive actuator 5a, a brake actuator 5b, and a steering actuator 5c.

The drive actuator 5a is a device for adjusting a drive force of the host vehicle α. In particular, when the host vehicle α is mounted with an engine as a traveling drive source, the drive actuator 5a includes a throttle actuator that adjusts an amount of air supplied to the engine (throttle opening degree) or the like. On the other hand, when the host vehicle α is a hybrid vehicle or an electric vehicle in which a motor is mounted as a traveling drive source, the drive actuator 5a includes a circuit (an inverter, a converter, or the like) capable of adjusting electric power supplied to the motor.

The brake actuator 5b is a device that adjusts a braking force acting on the host vehicle α. The brake actuator 5b is implemented by a configuration (disc brake or the like) for obtaining the braking force of the host vehicle α by a frictional force and/or a configuration (regenerative brake) for obtaining the braking force of the host vehicle α by a regenerative force of the motor mounted as a traveling drive source.

The steering actuator 5c includes an assist motor that controls a steering torque of an electric power steering system.

The display 6 is a device that is disposed in the vehicle interior and displays information based on a calculation result of the controller 20. The display 6 may be incorporated in a device equipped with a human machine interface (HMI) that receives an input (touch panel operation or the like) from the occupant of the host vehicle α.

The controller 20 as an autonomous driving control device includes a computer including a central processing unit (CPU), a read-only memory (ROM), a random access memory (RAM), and an input/output interface (I/O interface). The controller 20 is programmed to be capable of executing various processing in an autonomous driving control method to be described later.

Functions of the controller 20 are implemented by an advanced driver assistance system (ADAS)/autonomous driving (AD) controller that performs main processing related to driving control of the host vehicle α or the like. The functions of the controller 20 may be implemented by any computer mounted on the host vehicle α, such as a motor controller, an engine control unit (ECU), or a vehicle control unit (VCU). In addition, the controller 20 may be configured by implementing a program on one piece of computer hardware, or may be configured to execute the autonomous driving control methods according to the embodiments by implementing a program in which each processing is distributed on a plurality of pieces of computer hardware and integrating the plurality of pieces of computer hardware.

In particular, the controller 20 performs various calculations for executing the autonomous driving control methods according to the embodiments by using various types of information received from the external sensor 1, the internal sensor 2, the navigation system 3, and the communication interface 4 as inputs, displays a calculation result on the display 6, and operates the actuator 5 based on the calculation result.

More specifically, from a viewpoint of adjusting an inter-vehicle distance between the host vehicle α and a preceding vehicle β to a predetermined target inter-vehicle distance, the controller 20 operates the actuator 5 to execute following control of adjusting a difference between the host vehicle speed Vα and a vehicle speed of the preceding vehicle β (hereinafter also referred to as a "preceding vehicle speed Vβ"). Here, the target inter-vehicle distance is set to a predetermined appropriate inter-vehicle distance from a viewpoint of safety and suppression of overtaking of another vehicle. The target inter-vehicle distance may be a fixed value, or may be a variable value that varies according to the traveling state of the host vehicle α (host vehicle speed Vα, acceleration, or the like).

In particular, hereinafter, a target inter-vehicle distance at a timing at which the host vehicle α stops following the stop of the preceding vehicle β (timing at which both the host vehicle speed Vα and the preceding vehicle speed Vβ are zero) is referred to as an "at-stopping inter-vehicle distance Dβ".

The at-stopping inter-vehicle distance Dβ is set to an appropriate value from a viewpoint of maintaining an appropriate inter-vehicle distance to the preceding vehicle β in a stop state of the host vehicle α. In particular, in the following embodiments, an appropriate at-stopping inter-vehicle distance Dβ according to various scenes is set to any one of a "basic at-stopping inter-vehicle distance $D\beta_0$", a "first at-stopping inter-vehicle distance $D\beta_1$", and a "second at-stopping inter-vehicle distance $D\beta_2$". Here, the basic at-stopping inter-vehicle distance $D\beta_0$ is set to an appropriate value (for example, about 5 m) from a viewpoint that the preceding vehicle β can be avoided by turning when the host vehicle α starts traveling from the stop state. For example, when an area where stopping is prohibited for legal or safety reasons (stop prohibited area such as an intersection, a railroad crossing, or an entrance of an emergency vehicle) is present between the preceding vehicle β and the host vehicle α, from a viewpoint of avoiding the area and stopping the host vehicle α, the basic at-stopping inter-vehicle distance $D\beta_0$ can be set to a value larger than the value at which the preceding vehicle β can be avoided by turning.

Hereinafter, the autonomous driving control methods according to the embodiments will be described in detail based on the above configuration.

First Embodiment

Hereinafter, an autonomous driving control method according to a first embodiment will be described. In the present embodiment, a control mode in which, after the host vehicle α is stopped in a state where the at-stopping inter-vehicle distance Dβ is set to the basic at-stopping inter-vehicle distance $D\beta_0$, the stop position Pα of the host vehicle α is changed in order to facilitate retreating of the preceding vehicle β or a following vehicle γ from the crossing lane Ct will be described.

Figure 2:
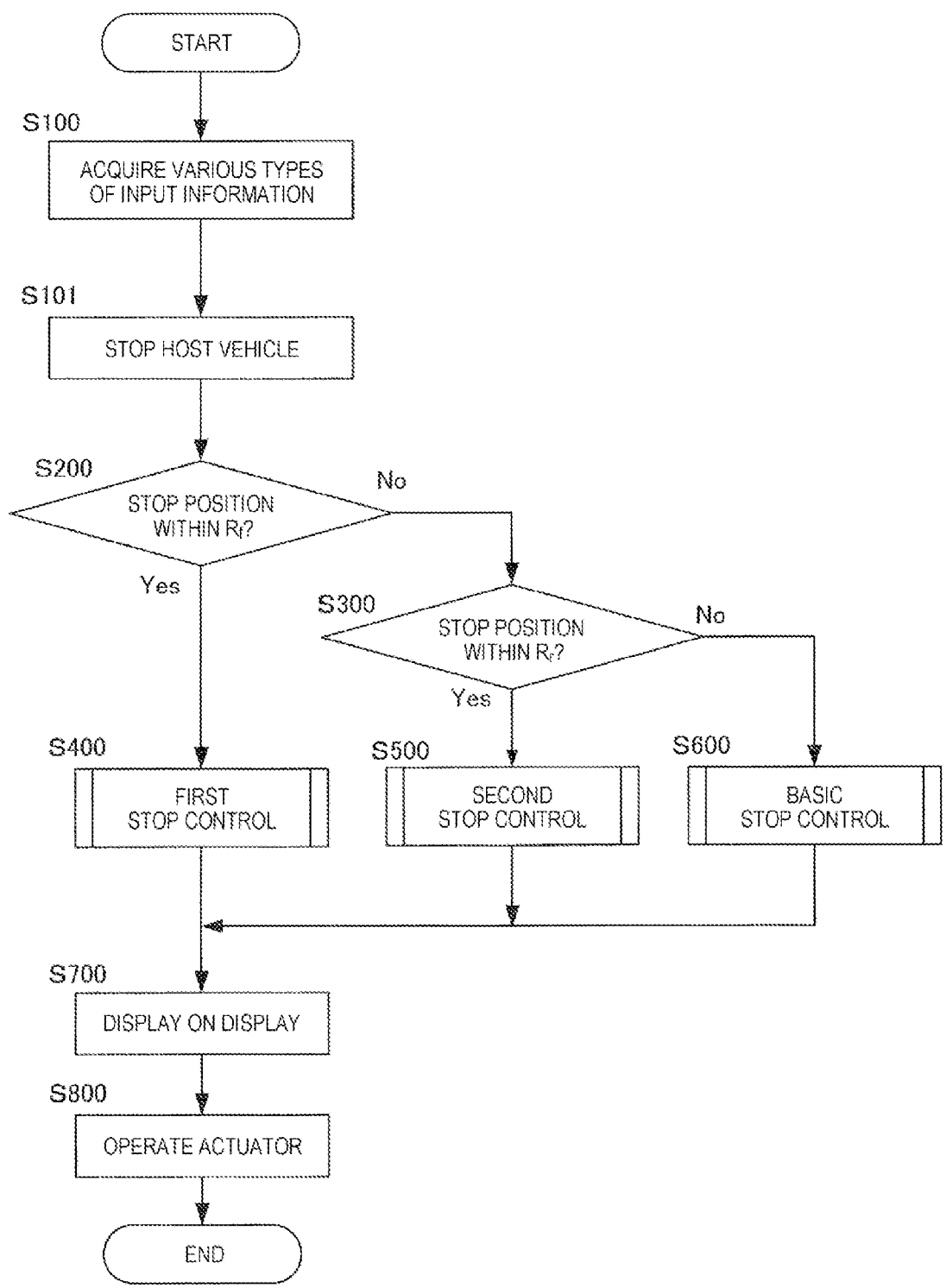
FIG. 2 is a flowchart illustrating an autonomous driving control method according to a first embodiment.

FIG. 2 is a flowchart illustrating the autonomous driving control method according to the present embodiment. The controller 20 repeatedly executes processing described below at each predetermined control period.

First, in step S100, the controller 20 acquires various types of input information. Specifically, the controller 20 acquires, as the input information, information detected by the external sensor 1 (particularly including the inter-vehicle distance between the host vehicle α and the preceding vehicle β, the preceding vehicle speed Vβ, and the like), information detected by the internal sensor 2 (particularly including the surrounding image, the surrounding vehicle detection data, the host vehicle speed Vα, and the like), information obtained by the navigation system 3 (particularly including the position information of the host vehicle α, the traveling route information, the HDD map, and the like), and information obtained by the communication interface 4 (particularly including vehicle-to-vehicle communication information, road-to-vehicle communication information, and the like).

In step S101, the controller 20 causes the host vehicle α to stop at a stop position Pα (hereinafter also referred to as a "basic stop position $P\alpha_0$") based on the basic at-stopping inter-vehicle distance $D\beta_0$ following the stop of the preceding vehicle β.

Next, in step S200, the controller 20 determines whether the stop position Pα of the host vehicle α is within a forward stop limit area $R_f$ set in front of the crossing lane Ct.

Here, the crossing lane Ct in the present description means an area defined as a merging portion of the traveling lane L1 on which the host vehicle α travels and a traveling lane of a vehicle (including an automobile, a tram, and a railroad vehicle) intersecting with the traveling lane L1 (hereinafter also referred to as a "crossing traveling lane L2"). The crossing lane Ct includes a crosswalk along the traveling lane L1 and a crosswalk along the crossing traveling lane L2. In addition, the forward stop limit area $R_f$ is an area extending over a predetermined range on an outer side in front of the crossing lane Ct in the traveling lane L1 of the host vehicle α. In particular, when the stop position Pα of the host vehicle α is within the forward stop limit area $R_f$, the forward stop limit area $R_f$ is set to a range in which an advancing departure of the following vehicle γ from the crossing lane Ct is considered to be blocked. Further, in the present embodiment, the forward stop limit area $R_f$ is stored in advance in a storage area readable by the controller 20. Considering that a length from the stop position Pα of the host vehicle α to a rear end of a vehicle body varies depending on a vehicle type or the like, an extension length of the forward stop limit area $R_f$ may be appropriately adjusted according to a vehicle body size of the host vehicle α (in particular, vehicle length and vehicle width).

More specifically, the controller 20 determines whether the stop position Pα is within the forward stop limit area $R_f$ by referring to the surrounding image, the surrounding vehicle detection data, known vehicle body size data of the host vehicle α, and/or the HD map. Then, when it is determined that the stop position Pα is within the forward stop limit area $R_f$, the controller 20 executes first stop control in step S400.

In the first stop control in step S400, the controller 20 switches the at-stopping inter-vehicle distance Dβ to the first at-stopping inter-vehicle distance $D\beta_1$ shorter than the basic at-stopping inter-vehicle distance $D\beta_0$.

Here, the first at-stopping inter-vehicle distance $D\beta_1$ is a correction value that is set to decrease and correct the basic at-stopping inter-vehicle distance $D\beta_0$ from a viewpoint of changing the stop position Pα forward (direction in which the inter-vehicle distance to the preceding vehicle β is shortened) such that the stop position Pα is not within the forward stop limit area $R_f$. The first at-stopping inter-vehicle distance $D\beta_1$ is preferably set to a length that does not excessively shorten the inter-vehicle distance between the preceding vehicle β and the host vehicle α (for example, about ½ of the basic at-stopping inter-vehicle distance $D\beta_0$), while achieving an object of preventing the stop position Pα from being within the forward stop limit area $R_f$. Then, when the at-stopping inter-vehicle distance Dβ is switched to the first at-stopping inter-vehicle distance $D\beta_1$, the controller 20 executes subsequent processing from step S700.

On the other hand, when it is determined in step S200 that the stop position Pα is not within the forward stop limit area $R_f$, the controller 20 executes processing in step S300.

In step S300, the controller 20 determines whether the stop position Pα is within a rearward stop limit area $R_r$. Here, the rearward stop limit area $R_r$ is an area extending over a predetermined range on an outer side behind the crossing lane Ct in the traveling lane L1 of the host vehicle α. In particular, when the stop position Pα is within the rearward stop limit area $R_r$, the rearward stop limit area $R_r$ is set to a range in which a retracting departure of the preceding vehicle β from the crossing lane Ct is considered to be blocked. In the present embodiment, the rearward stop limit area $R_r$ is stored in advance in the storage area readable by the controller 20. Similar to the forward stop limit area $R_f$, an extension length of the rearward stop limit area $R_r$ may be appropriately adjusted according to the vehicle body size of the host vehicle α (in particular, vehicle length and vehicle width).

More specifically, the controller 20 determines whether the stop position Pα is within the rearward stop limit area $R_r$ by referring to the surrounding image, the surrounding vehicle detection data, known vehicle body size data of the host vehicle α, and/or the HD map. Then, when it is determined that the stop position Pα is within the rearward stop limit area $R_r$, the controller 20 executes second stop control in step S500.

In the second stop control in step S500, the controller 20 switches the at-stopping inter-vehicle distance Dβ to the second at-stopping inter-vehicle distance $Dβ_2$ longer than the basic at-stopping inter-vehicle distance $Dβ_0$.

Here, the second at-stopping inter-vehicle distance $Dβ_2$ is a correction value that is set to increase and correct the basic at-stopping inter-vehicle distance $Dβ_0$ from a viewpoint of changing the stop position Pα rearward (direction in which the inter-vehicle distance to the preceding vehicle β is increased) such that the stop position Pα is not within the rearward stop limit area $R_r$. The second at-stopping inter-vehicle distance $Dβ_2$ is preferably set to a length that does not excessively shorten the inter-vehicle distance between the host vehicle α and the following vehicle γ, while achieving an object of preventing the stop position Pα from being within the rearward stop limit area $R_r$. Then, when the at-stopping inter-vehicle distance Dβ is switched to the second at-stopping inter-vehicle distance $Dβ_2$, the controller 20 executes the subsequent processing from step S700.

On the other hand, when it is determined in step S300 that the stop position Pα is not within the rearward stop limit area $R_r$, the controller 20 executes processing in step S600.

In basic stop control in step S600, the controller 20 maintains the at-stopping inter-vehicle distance Dβ at the basic at-stopping inter-vehicle distance $Dβ_0$ (maintains the stop position Pα at the basic stop position $Pα_0$), and executes the subsequent processing from step S700.

Next, when any one of the above-described first stop control (step S400), second stop control (step S500), and basic stop control (step S600) is ended, the controller 20 executes the processing in step S700.

In step S700, the controller 20 performs processing of displaying information to be notified to the occupant of the host vehicle α on the display 6 in response to the execution of one of the first stop control and the second stop control. For example, when the first stop control is executed, the controller 20 displays, on the display 6, a text indicating that "because the rearward vehicle cannot depart, the inter-vehicle distance to the forward vehicle will be reduced" and image information for assisting the occupant in understanding the text, as necessary. On the other hand, when the second stop control is executed, the controller 20 displays, on the display 6, a text indicating that "because the forward vehicle cannot depart, an inter-vehicle distance will be made" and image information for assisting the occupant in understanding the text, as necessary. The specific content displayed on the display 6 is not limited thereto, and may be appropriately changed.

Then, in step S800, the controller 20 operates the actuator 5 such that an actual inter-vehicle distance between the preceding vehicle β and the host vehicle α approaches a distance determined by the first stop control, the second stop control, or the basic stop control (that is, one of the first at-stopping inter-vehicle distance $Dβ_1$, the second at-stopping inter-vehicle distance $Dβ_2$, and the basic at-stopping inter-vehicle distance $Dβ_0$).

Therefore, when the first stop control (step S400) is executed, the controller 20 moves the host vehicle α such that the stop position Pα of the host vehicle α is changed from the basic stop position $Pα_0$ to a forward position (hereinafter also referred to as a "first corrected stop position Pa1"). When the second stop control (step S500) is executed, the controller 20 moves the host vehicle α such that the stop position Pα of the host vehicle α is changed from the basic stop position $Pα_0$ to a rearward position (hereinafter also referred to as a "second corrected stop position Paz"). On the other hand, when the basic stop control (step S600) is executed, the controller 20 maintains the stop position Pα at the basic stop position $Pα_0$.

Next, an example of a control result when the autonomous driving control method according to the present embodiment described above is applied to a specific scene will be described.

Figure 3:
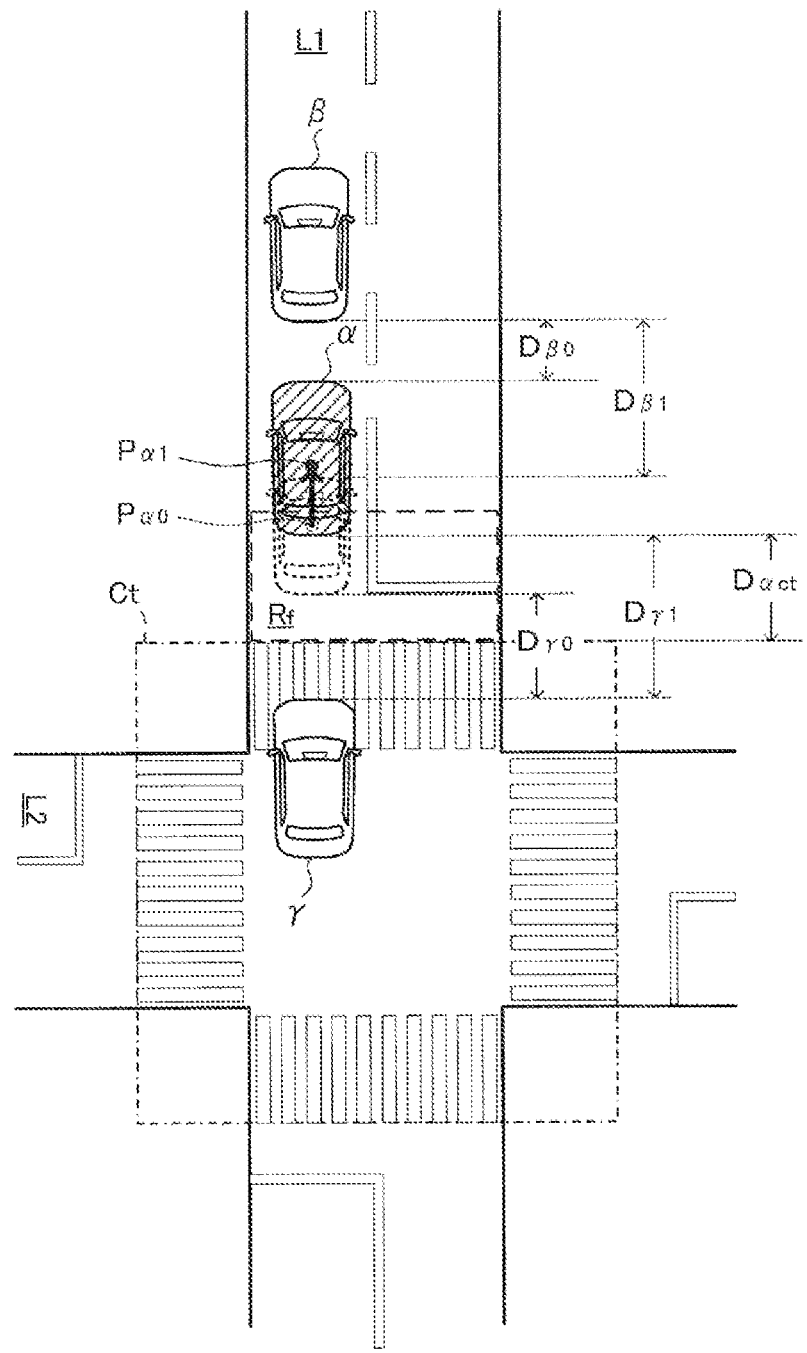
FIG. 3 is a diagram illustrating an example of a specific scene to which first stop control is applied.

FIG. 3 is a diagram illustrating an example of a specific scene to which the first stop control is applied. In particular, in FIG. 3, a scene in which the basic stop position $Pα_0$ of the host vehicle α is within the forward stop limit area $R_f$ is assumed (see the host vehicle α indicated by a single-dot two-chain line). In this scene, when the autonomous driving control method according to the present embodiment is applied, the at-stopping inter-vehicle distance Dβ is set to the first at-stopping inter-vehicle distance $Dβ_1$ shorter than the basic at-stopping inter-vehicle distance $Dβ_0$ in accordance with control logic in step S200 and step S400. Therefore, since the host vehicle α moves such that the stop position Pα is changed from the basic stop position $Pα_0$ to the first corrected stop position Pa1 forward, a space between the host vehicle α (more specifically, the rear end of the vehicle body of the host vehicle α) and the crossing lane Ct can be widened so as to allow advancing of the following vehicle γ.

Figure 4:
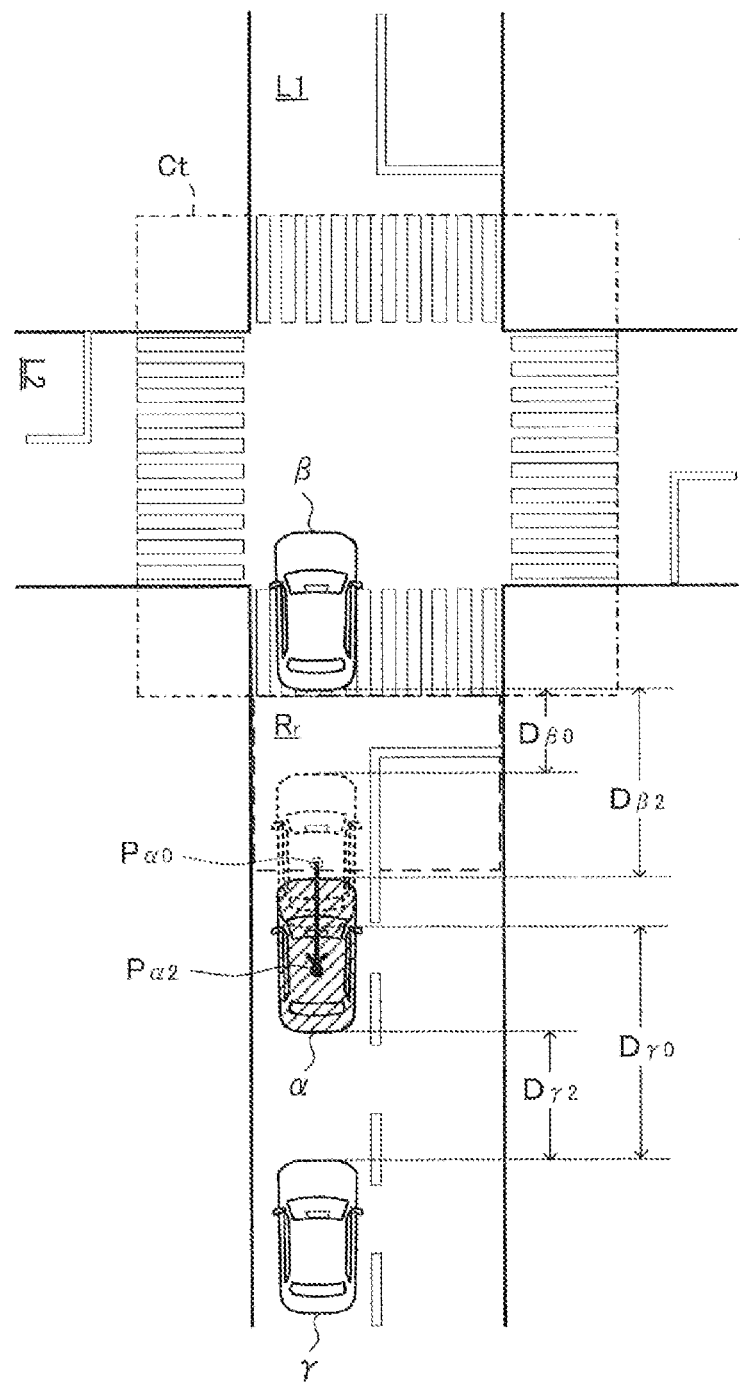
FIG. 4 is a diagram illustrating an example of a specific scene to which second stop control is applied.

On the other hand, FIG. 4 is a diagram illustrating an example of a specific scene to which the second stop control is applied. In particular, in FIG. 4, a scene in which the basic stop position $Pα_0$ of the host vehicle α is within the rearward stop limit area $R_r$ is assumed (see the host vehicle α indicated by a single-dot two-chain line). In this scene, when the autonomous driving control method according to the present embodiment is applied, the at-stopping inter-vehicle distance Dβ is set to the second at-stopping inter-vehicle distance $Dβ_2$ longer than the basic at-stopping inter-vehicle distance $Dβ_0$ in accordance with control logic in step S200 and step S500. Therefore, since the host vehicle α moves such that the stop position Pα is changed from the basic stop position $Pα_0$ to the second corrected stop position Paz rearward, a space between the crossing lane Ct and the host vehicle α (more specifically, a front end of the vehicle body of the host vehicle α) can be widened so as to allow retracting of the preceding vehicle β.

According to the present embodiment having the configuration described above, the following operations and effects are exerted.

In the present embodiment, an autonomous driving control method is provided in which the host vehicle α is stopped such that the inter-vehicle distance to the preceding vehicle β is the predetermined at-stopping inter-vehicle distance Dβ.

In the autonomous driving control method, when the stop position Pα of the host vehicle α is within the forward stop limit area $R_f$ set in front of the crossing lane Ct (Yes in step S200), the first stop control (step S400) of setting the at-stopping inter-vehicle distance Dβ to the first at-stopping inter-vehicle distance $Dβ_1$ shorter than the predetermined basic at-stopping inter-vehicle distance $Dβ_0$ is executed. In addition, when the stop position Pα of the host vehicle α is within the rearward stop limit area $R_r$ set behind the crossing lane Ct (Yes in step S300), the second stop control (step S600) of setting the at-stopping inter-vehicle distance Dβ to the second at-stopping inter-vehicle distance $D\beta_2$ longer than the basic at-stopping inter-vehicle distance $D\beta_0$ is executed.

Accordingly, when the stop position $P\alpha$ of the host vehicle α (in particular, basic stop position $P\alpha_0$) is within the forward stop limit area $R_f$, the host vehicle α can be changed to a position in front of the original stop position $P\alpha$ (first corrected stop position $P\alpha_1$). Therefore, a space between the host vehicle α in the stop state and the crossing lane Ct located behind the host vehicle α can be widened. That is, since a space in which the following vehicle γ advances and retreats from the crossing lane Ct can be secured, the following vehicle γ can be prevented from being left in the crossing lane Ct.

On the other hand, when the basic stop position $P\alpha_0$ is within the rearward stop limit area $R_r$, the host vehicle α can be changed to a position behind the original stop position $P\alpha$ (second corrected stop position $P\alpha_2$). Therefore, a space between the host vehicle α in the stop state and the crossing lane Ct located in front of the host vehicle α can be widened. That is, since a space in which the preceding vehicle β retracts and retreats from the crossing lane Ct can be secured, the preceding vehicle β can be prevented from being left in the crossing lane Ct.

In addition, in this way, by preventing the preceding vehicle β or the following vehicle γ from being left in the crossing lane Ct, traveling of a vehicle in the crossing lane Ct (for example, a vehicle in the crossing traveling lane L2) can be suppressed from being blocked, and traffic efficiency can be improved.

In particular, in the present embodiment, when the stop position $P\alpha$ of the host vehicle α is within the forward stop limit area $R_f$, the forward stop limit area $R_f$ is set to a range in which the host vehicle α blocks the advancing departure of the following vehicle γ from the crossing lane Ct. In addition, when the stop position $P\alpha$ of the host vehicle α is within the rearward stop limit area $R_r$, the rearward stop limit area $R_r$ is set to a range in which the retracting departure of the preceding vehicle β from the crossing lane Ct is blocked.

Accordingly, specific control logic for accurately detecting a scene in which the host vehicle α stops in a state where the host vehicle α can block the retreating of the following vehicle γ or the preceding vehicle β from the crossing lane Ct, and appropriately changing the stop position $P\alpha$ of the host vehicle α in the scene is achieved.

Further, in the autonomous driving control method according to the present embodiment, the at-stopping inter-vehicle distance $D\beta$ is set to the basic at-stopping inter-vehicle distance $D\beta_0$ and the host vehicle α is stopped (step S101). Then, whether the stop position $P\alpha$ of the host vehicle α is within the forward stop limit area $R_f$ or within the rearward stop limit area $R_r$, or within neither the forward stop limit area $R_f$ nor the rearward stop limit area $R_r$ is determined (step S200 and step S300). Then, when it is determined that the stop position $P\alpha$ of the host vehicle α is within the forward stop limit area $R_f$, the first stop control is executed (Yes in step S200, and step S400). When it is determined that the stop position $P\alpha$ of the host vehicle α is not within the rearward stop limit area $R_r$, the second stop control is executed (Yes in step S300, and step S500). When it is determined that the stop position $P\alpha$ of the host vehicle α is within neither the forward stop limit area $R_f$ nor the rearward stop limit area $R_r$, the basic stop control of maintaining the basic at-stopping inter-vehicle distance $D\beta_0$ is executed (No in step S200, No in step S300, and step S600).

Accordingly, even after the host vehicle α is once stopped at the basic stop position $P\alpha_0$, specific control logic for changing the stop position $P\alpha$ in a scene in which the host vehicle α can block the retreating of the following vehicle γ or the preceding vehicle β from the crossing lane Ct, and otherwise, maintaining the stop position $P\alpha$ of the host vehicle α at the original basic stop position $P\alpha_0$ is achieved.

According to the present embodiment, the controller 20 as an autonomous driving control device for executing the above autonomous driving control method, that is, an autonomous driving control device that stops the host vehicle α such that the inter-vehicle distance to the preceding vehicle β is the predetermined at-stopping inter-vehicle distance $D\beta$ is provided.

The controller 20 includes at least one of a first stop control unit (step S400) and a second stop control unit (step S500). When the stop position $P\alpha$ of the host vehicle α is within the forward stop limit area $R_f$ set in front of the crossing lane Ct (Yes in step S200), the first stop control unit sets the at-stopping inter-vehicle distance $D\beta$ to the first at-stopping inter-vehicle distance $D\beta_1$ shorter than the predetermined basic at-stopping inter-vehicle distance $D\beta_0$. In addition, when the stop position $P\alpha$ of the host vehicle α is within the rearward stop limit area $R_r$ set behind the crossing lane Ct (Yes in step S300), the second stop control unit sets the at-stopping inter-vehicle distance $D\beta$ to the second at-stopping inter-vehicle distance $D\beta_2$ longer than the basic at-stopping inter-vehicle distance $D\beta_0$.

Accordingly, a suitable system configuration for executing the above autonomous driving control method is achieved.

Second Embodiment

Hereinafter, an autonomous driving control method according to a second embodiment will be described. The same elements as those in the first embodiment are denoted by the same reference numerals, and the description thereof will be omitted. In the present embodiment, an example in which the stop position $P\alpha$ of the host vehicle α is predicted in advance, and the stop position $P\alpha$ is adjusted based on a determination result of whether the predicted stop position $P\alpha$ (hereinafter also referred to as a "scheduled stop position $P^\smallfrown\alpha$") is within the forward stop limit area $R_f$ or the rearward stop limit area $R_r$ will be described.

Figure 5:
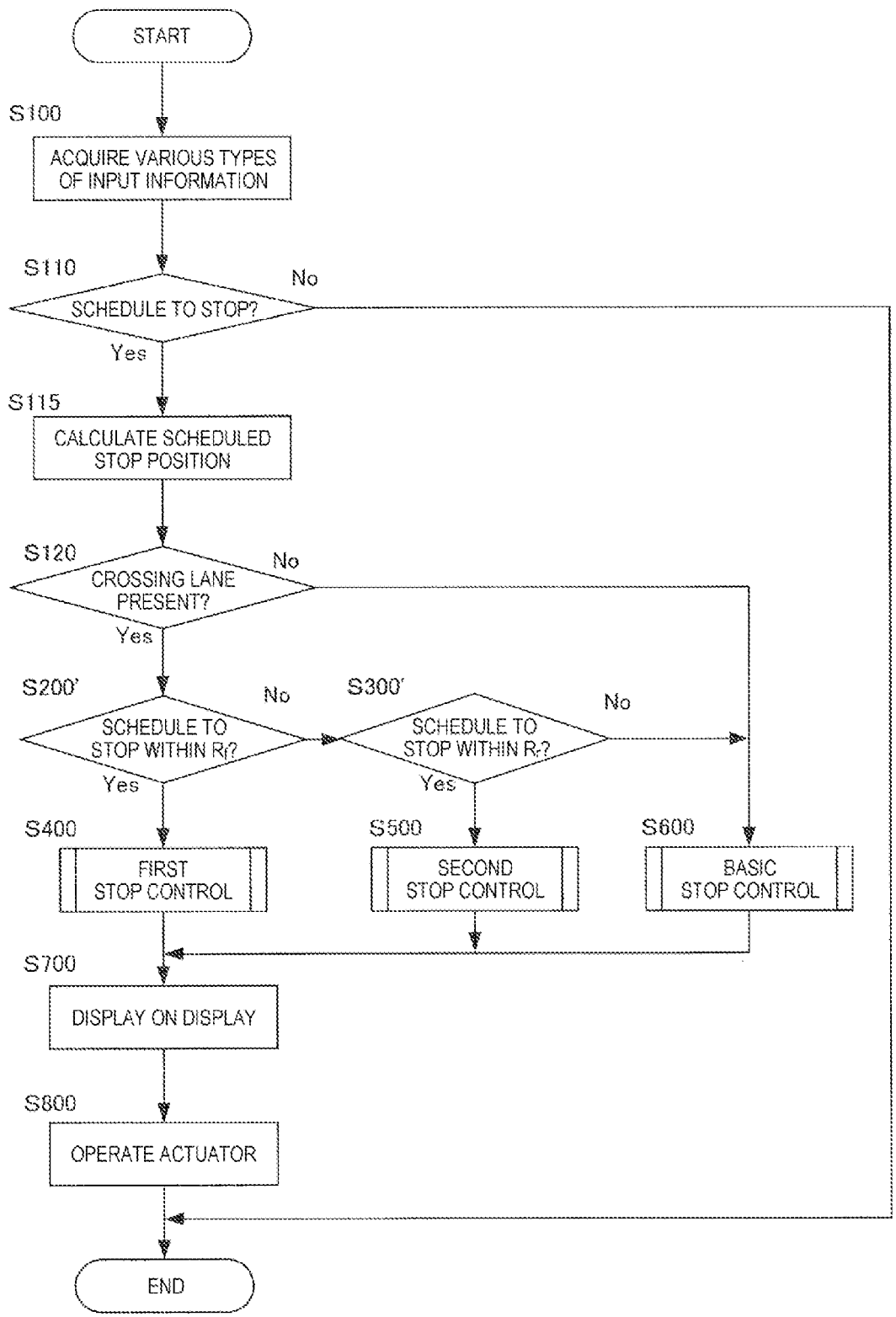
FIG. 5 is a flowchart illustrating an autonomous driving control method according to a second embodiment.

FIG. 5 is a flowchart illustrating the autonomous driving control method according to the present embodiment. The controller 20 repeatedly executes processing described below at each predetermined control period.

First, in step S100, the controller 20 acquires various types of input information as in the first embodiment.

Next, in step S110, the controller 20 determines whether the host vehicle α is scheduled to stop. Specifically, the controller 20 refers to a surrounding image and/or surrounding vehicle detection data and the like, and determines whether the host vehicle α is in the process of stopping (just before stop) with reference to whether the preceding vehicle speed $V\beta$ related to the preceding vehicle β that is a following target is equal to or less than a predetermined value.

In step S115, the controller 20 calculates the scheduled stop position $P^\smallfrown\alpha$. Specifically, on the premise that the at-stopping inter-vehicle distance $D\beta$ is set to the basic at-stopping inter-vehicle distance $D\beta_0$, the controller 20 obtains, as the scheduled stop position $P^\smallfrown\alpha$, a position at which the host vehicle α is predicted to stop when the host vehicle speed $V\alpha$, the preceding vehicle speed $V\beta$, and a vehicle speed difference $\Delta V\alpha\beta$ all reach zero. In the following description, the scheduled stop position $P\hat{\ }\alpha$ when the at-stopping inter-vehicle distance $D\beta$ is set to the basic at-stopping inter-vehicle distance $D\beta_0$ is particularly referred to as a "basic scheduled stop position $P\hat{\ }\alpha_0$".

Next, in step S120, the controller 20 determines whether the crossing lane Ct is present around the basic scheduled stop position $P\hat{\ }\alpha_0$. Specifically, the controller 20 determines whether the crossing lane Ct is present around the basic scheduled stop position $P\hat{\ }\alpha_0$ based on the surrounding image, traveling route information, an HD map, vehicle-to-vehicle communication information, and/or road-to-vehicle communication information.

Then, when it is determined that the crossing lane Ct is not present around the basic scheduled stop position $P\hat{\ }\alpha_0$, the controller 20 executes basic stop control in step S600. That is, in this case, the controller 20 maintains the state where the at-stopping inter-vehicle distance $D\beta$ is set to the basic at-stopping inter-vehicle distance $D\beta_0$. On the other hand, when it is determined that the crossing lane Ct is present around the basic scheduled stop position $P\hat{\ }\alpha_0$, the controller 20 executes subsequent processing from step S200'.

In step S200', the controller 20 determines whether the basic scheduled stop position $P\hat{\ }\alpha_0$ is within the forward stop limit area $R_f$ of the crossing lane Ct. Specifically, the controller executes the determination by referring to the surrounding image, the traveling route information, and/or the HD map based on whether coordinates of the basic scheduled stop position $P\hat{\ }\alpha_0$ in a predetermined coordinate system (for example, world coordinates) are within a range that defines the forward stop limit area $R_f$ on the same coordinate system.

Then, when it is determined that the basic scheduled stop position $P\hat{\ }\alpha_0$ is within the forward stop limit area $R_f$, the controller 20 executes first stop control in step S400. That is, similar to the first embodiment, the controller 20 switches the at-stopping inter-vehicle distance $D\beta$ from the basic at-stopping inter-vehicle distance $D\beta_0$ to the first at-stopping inter-vehicle distance $D\beta_1$ shorter than the basic at-stopping inter-vehicle distance $D\beta_0$. On the other hand, when it is determined that the basic scheduled stop position $P\hat{\ }\alpha_0$ is not within the forward stop limit area $R_f$, the controller 20 executes processing in step S300'.

In step S300', the controller 20 determines whether the basic scheduled stop position $P\hat{\ }\alpha_0$ is within the rearward stop limit area $R_r$ of the crossing lane Ct. Specifically, the controller executes the determination by referring to the surrounding image, the traveling route information, and/or the HD map based on whether coordinates of the basic scheduled stop position $P\hat{\ }\alpha_0$ in a predetermined coordinate system (for example, world coordinates) are within a range that defines the rearward stop limit area $R_r$ on the same coordinate system.

Then, when it is determined that the basic scheduled stop position $P\hat{\ }\alpha_0$ is within the rearward stop limit area $R_r$, the controller 20 executes second stop control in step S500. That is, similar to the first embodiment, the controller 20 switches the at-stopping inter-vehicle distance $D\beta$ from the basic at-stopping inter-vehicle distance $D\beta_0$ to the second at-stopping inter-vehicle distance $D\beta_2$ longer than the basic at-stopping inter-vehicle distance $D\beta_0$. On the other hand, when it is determined that the basic scheduled stop position $P\hat{\ }\alpha_0$ is not within the rearward stop limit area $R_r$, the controller 20 executes processing in step S600 (basic stop control). That is, the controller 20 maintains the scheduled stop position $P\hat{\ }\alpha$ of the host vehicle $\alpha$ at the basic scheduled stop position $P\hat{\ }\alpha_0$.

According to the autonomous driving control method of the present embodiment having the configuration described above, the following operations and effects are exerted.

In the autonomous driving control method according to the present embodiment, the at-stopping inter-vehicle distance $D\beta$ is set to the basic at-stopping inter-vehicle distance $D\beta_0$ and the stop position $P\alpha$ (scheduled stop position $P\hat{\ }\alpha$) when the host vehicle $\alpha$ is stopped (step S115) is predicted. In addition, whether the predicted scheduled stop position $P\hat{\ }\alpha$(in particular, basic scheduled stop position $P\hat{\ }\alpha_0$) is within the forward stop limit area $R_f$ or the rearward stop limit area 12, is determined (step S200' and step S300'). Then, when it is determined that the basic scheduled stop position $P\hat{\ }\alpha_0$ is within the forward stop limit area $R_f$, the first stop control is executed (Yes in step S200', and step S400). On the other hand, when it is determined that the basic scheduled stop position $P\hat{\ }\alpha_0$ is within the rearward stop limit area $R_r$, the second stop control is executed (Yes in step S300', and step S500). When it is determined that the basic scheduled stop position $P\hat{\ }\alpha_0$ is within neither the forward stop limit area $R_f$ nor the rearward stop limit area $R_r$, the basic stop control of maintaining the basic at-stopping inter-vehicle distance $D\beta_0$ is executed (No in step S200', No in step S300', and step S600).

Accordingly, when the host vehicle $\alpha$ is traveling, specific control logic for predicting a situation in which the stop position $P\alpha$ when the vehicle is actually stopped is within the forward stop limit area $R_f$ or the rearward stop limit area $R_r$ (that is, a situation in which the retreating of the following vehicle $\gamma$ or the preceding vehicle $\beta$ from the crossing lane Ct is blocked) in advance, and appropriately adjusting the at-stopping inter-vehicle distance $D\beta$ is achieved. Therefore, since the host vehicle $\alpha$ can be directly stopped so as not to block the retreating of the following vehicle $\gamma$ or the preceding vehicle $\beta$ from the crossing lane Ct, control of moving the host vehicle a again after temporary stop can be omitted. As a result, the situation in which the following vehicle $\gamma$ or the preceding vehicle $\beta$ is left in the crossing lane Ct can be prevented, and discomfort of an occupant caused by moving the host vehicle $\alpha$ again after the stop can be reduced.

Third Embodiment

Hereinafter, a third embodiment will be described. The same elements as those in the first embodiment or the second embodiment are denoted by the same reference numerals, and the description thereof will be omitted. In the present embodiment, a control mode in which, based on the autonomous driving control method described with reference to FIG. 5, whether the following vehicle $\gamma$ is present in the crossing lane Ct is determined, and the at-stopping inter-vehicle distance $D\beta$ is set according to the determination result will be described.

Figure 6:
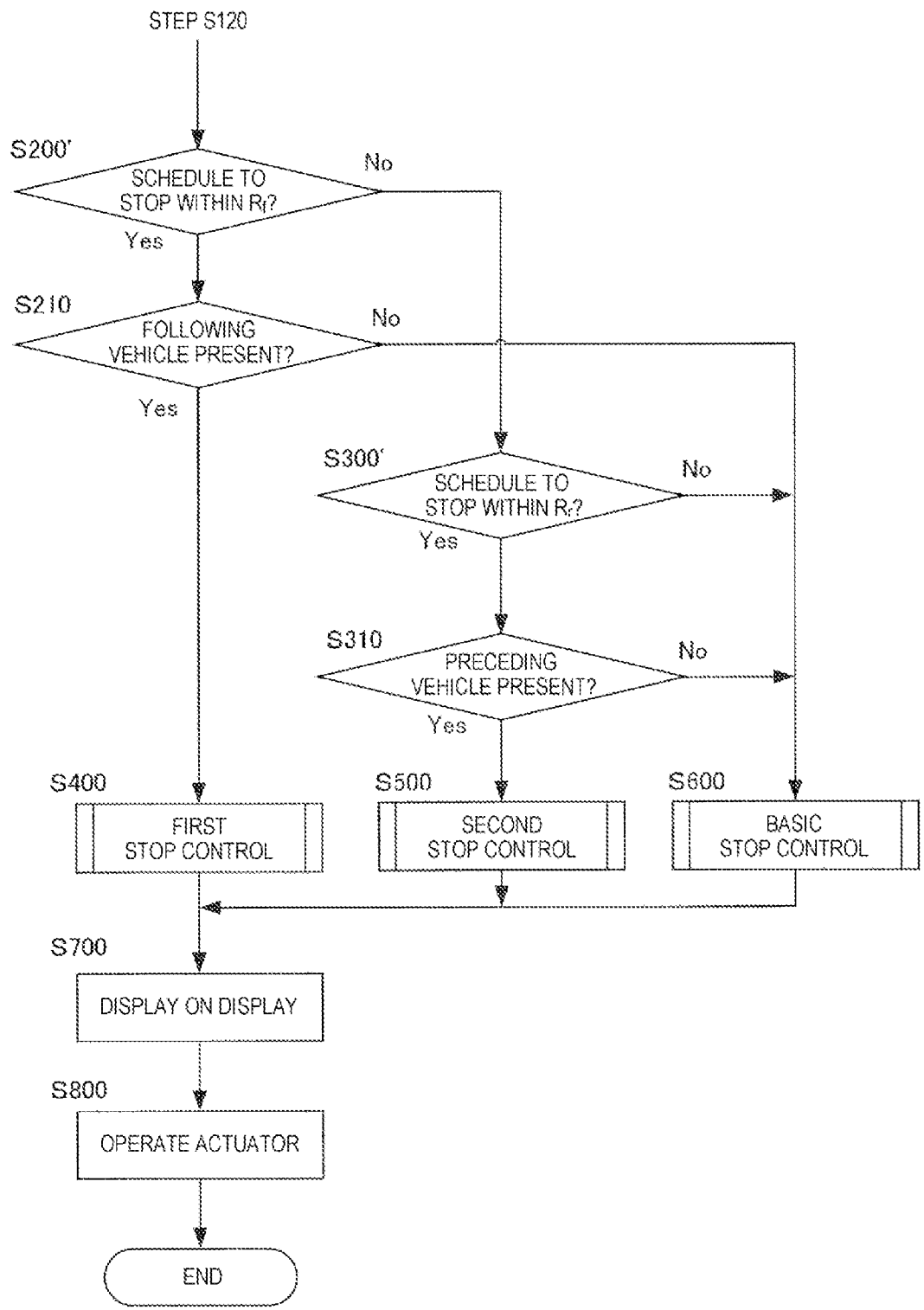
FIG. 6 is a flowchart illustrating an autonomous driving control method according to a third embodiment.

FIG. 6 is a flowchart illustrating an autonomous driving control method according to the present embodiment. For simplification of the drawings, blocks of step S100, step S115, and step S120, which are common to those in FIG. 5, are not illustrated.

In particular, in the present embodiment, when it is determined in step S200' that the basic scheduled stop position $P\hat{\ }\alpha_0$ is within the forward stop limit area $R_f$ of the crossing lane Ct, the controller 20 executes processing in step S210.

In step S210, the controller 20 determines whether the following vehicle $\gamma$ is present in the crossing lane Ct. Specifically, the controller 20 determines whether the following vehicle γ is present in the crossing lane Ct by referring to a surrounding image (in particular, an image obtained by imaging a rearward of the host vehicle α), surrounding vehicle detection data, and/or vehicle-to-vehicle communication information.

Then, when it is determined that the following vehicle γ is present in the crossing lane Ct, the controller 20 executes first stop control in step S400. On the other hand, when it is determined that the following vehicle γ is not present in the crossing lane Ct, the controller 20 executes processing in step S600 (basic stop control). That is, the controller 20 maintains the at-stopping inter-vehicle distance Dβ at the basic at-stopping inter-vehicle distance $Dβ_0$.

On the other hand, when it is determined in step S200' that the basic scheduled stop position $P^α_0$ is not within the forward stop limit area $R_f$ and it is determined in subsequent step S300' that the basic scheduled stop position $P^α_0$ is within the rearward stop limit area $R_r$, the controller 20 executes processing in step S310.

In step S310, the controller 20 determines whether the preceding vehicle β is present in the crossing lane Ct. Specifically, the controller 20 determines whether the preceding vehicle β is present in the crossing lane Ct by referring to a surrounding image (in particular, an image obtained by imaging a frontward of the host vehicle α), the surrounding vehicle detection data, and/or the vehicle-to-vehicle communication information.

Then, when it is determined that the preceding vehicle β is present in the crossing lane Ct, the controller 20 executes second stop control in step S500. On the other hand, when it is determined that the preceding vehicle β is not present in the crossing lane Ct, the controller 20 executes the basic stop control in step S600.

According to the autonomous driving control method of the present embodiment having the configuration described above, the following operations and effects are exerted.

In the autonomous driving control method according to the present embodiment, when the stop position Pα (basic scheduled stop position $P^α_0$) of the host vehicle α is within the forward stop limit area $R_f$, whether the following vehicle γ is present in the crossing lane Ct is further determined (Yes in step S200', and step S210). Then, when it is determined that the following vehicle γ is present, the first stop control is executed (Yes in step S210, and step S400), and when it is determined that the following vehicle γ is not present, the at-stopping inter-vehicle distance Dβ is maintained at the basic at-stopping inter-vehicle distance $Dβ_0$ (No in step S210, and step S600).

When the basic scheduled stop position $P^α_0$ of the host vehicle α is within the rearward stop limit area $R_r$, whether the preceding vehicle β is present in the crossing lane Ct is further determined (Yes in step S300', and step S310). Then, when it is determined that the preceding vehicle β is present, the second stop control is executed (Yes in step S310, and step S500), and when it is determined that the preceding vehicle β is not present, the at-stopping inter-vehicle distance Dβ is maintained at the basic at-stopping inter-vehicle distance $Dβ_0$ (No in step S310, and step S600).

Accordingly, specific control logic for adjusting the at-stopping inter-vehicle distance Dβ after confirming the presence or absence of the following vehicle γ or the preceding vehicle β that may be left in the crossing lane Ct in a scene in which the stop position Pα of the host vehicle α is within the forward stop limit area $R_f$ or the rearward stop limit area $R_r$ is achieved. Therefore, the control of changing the stop position Pα of the host vehicle α from the basic stop position $Pα_0$ to the first corrected stop position $Pα_1$ forward or the second corrected stop position Paz rearward can be limited and executed in a scene in which the following vehicle γ or the preceding vehicle β is likely to be left in the crossing lane Ct. As a result, specific control logic that can suppress a situation in which the stop position Pα of the host vehicle α is unnecessarily changed from the originally desired basic stop position $Pα_0$ is achieved.

Fourth Embodiment

Hereinafter, a fourth embodiment will be described. The same elements as those in the first to third embodiments are denoted by the same reference numerals, and the description thereof will be omitted. In the present embodiment, a mode related to specific processing in first stop control (step S400) will be described. In particular, in the first stop control according to the present embodiment, instead of immediately switching the at-stopping inter-vehicle distance Dβ from the basic at-stopping inter-vehicle distance $Dβ_0$ to the first at-stopping inter-vehicle distance $Dβ_1$, the switching is executed when a certain condition is satisfied.

Figure 7:
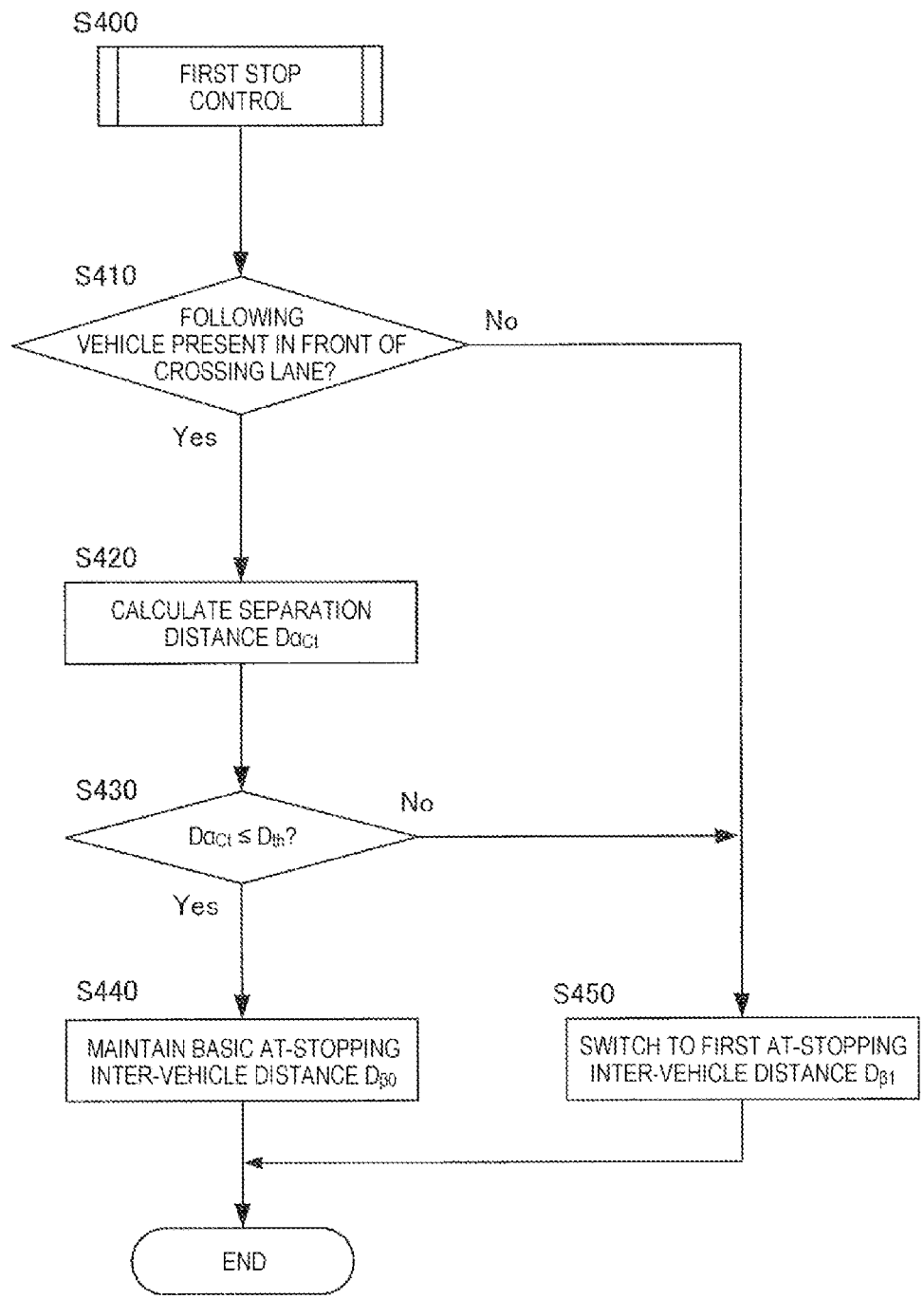
FIG. 7 is a flowchart illustrating first stop control according to a fourth embodiment.

FIG. 7 is a flowchart illustrating the first stop control according to the present embodiment.

As illustrated, first, in step S410, the controller 20 determines whether the following vehicle γ is present in a predetermined distance range in front of the crossing lane Ct. The distance range is set to an appropriate range from a viewpoint of determining whether the following vehicle γ is approaching the crossing lane Ct to such an extent that the following vehicle γ is blocked by the host vehicle α in the stop state and is left in the crossing lane Ct.

Specifically, the controller 20 determines whether the following vehicle γ is present in the above distance range by referring to a surrounding image (in particular, an image obtained by imaging a rearward of the host vehicle α), surrounding vehicle detection data, and/or vehicle-to-vehicle communication information.

Then, when it is determined that the following vehicle γ is not present in the distance range (more specifically, when it is determined that the following vehicle γ is present in the crossing lane Ct), the controller 20 proceeds the processing to step S450, and switches the at-stopping inter-vehicle distance Dβ from the basic at-stopping inter-vehicle distance $Dβ_0$ to the first at-stopping inter-vehicle distance $Dβ_1$. On the other hand, when it is determined that the following vehicle γ is present in the distance range, the controller 20 executes processing in step S420.

In step S420, the controller 20 refers to an image from the in-vehicle camera 1a and/or surrounding vehicle detection data, and obtains a separation distance $Dα_{Ct}$ from the host vehicle α to the crossing lane Ct rearward (see FIG. 3).

Next, in step S430, the controller 20 determines whether the separation distance $Dα_{Ct}$ is equal to or less than a predetermined distance threshold $D_{th}$. The distance threshold $D_{th}$ is set to an appropriate value as a reference for determining whether a magnitude of the separation distance $Dα_{Ct}$ allows the following vehicle γ to enter a space between the host vehicle α and the crossing lane Ct.

Then, when it is determined that the separation distance $Dα_{Ct}$ is equal to or less than the distance threshold $D_{th}$, the controller 20 proceeds the processing to step S440, and maintains the at-stopping inter-vehicle distance Dβ at the basic at-stopping inter-vehicle distance $Dβ_0$. On the other hand, when it is determined that the separation distance $Dα_{Ct}$ is not equal to or less than the distance threshold $D_{th}$ (when it is determined that the separation distance $Dα_{Ct}$ exceeds the distance threshold MO, the controller 20 proceeds he processing to step S450, and switches the at-stopping inter-vehicle distance Dβ from the basic at-stopping inter-vehicle distance $D\beta_0$ to the first at-stopping inter-vehicle distance $D\beta_1$.

According to the autonomous driving control method of the present embodiment having the configuration described above, the following operations and effects are exerted.

In the first stop control in the autonomous driving control method according to the present embodiment, whether the following vehicle γ is present in the predetermined distance range in front of the crossing lane Ct is determined (step S410). Then, when it is determined that the following vehicle γ is present in the distance range, whether the separation distance $D\alpha_{Ct}$ from the host vehicle α to the crossing lane Ct rearward exceeds the predetermined distance threshold $D_{th}$ is determined (step S420 and step S430). Then, when it is determined that the separation distance $D\alpha_{Ct}$ exceeds the distance threshold $D_{th}$, the at-stopping inter-vehicle distance Dβ is switched from the basic at-stopping inter-vehicle distance $D\beta_0$ to the first at-stopping inter-vehicle distance $D\beta_1$ (No in step S430, and step S450). In addition, when it is determined that the separation distance $D\alpha_{Ct}$ does not exceed the distance threshold $D_{th}$, the at-stopping inter-vehicle distance Dβ is maintained at the basic at-stopping inter-vehicle distance $D\beta_0$ (Yes in step S430, and step S440).

Accordingly, when the space between the host vehicle α and the crossing lane Ct is not sufficiently wide from the viewpoint of allowing the following vehicle γ to enter (separation distance $D\alpha_{Ct}$≤distance threshold MO, the stop position Pα of the host vehicle α is maintained at the basic stop position $P\alpha_0$. Therefore, even though the space between the host vehicle α and the crossing lane Ct is not sufficiently wide, the following vehicle γ can be prevented from being forced to enter the above space, which is slightly widened as a result of the host vehicle α stopping at the first corrected stop position $P\alpha_1$ in front of the basic stop position $P\alpha_0$. In addition, when the space between the host vehicle α and the crossing lane Ct is sufficiently wide from the viewpoint of allowing the following vehicle γ to enter (separation distance $D\alpha_{Ct}$>distance threshold MO, the at-stopping inter-vehicle distance Dβ is switched to the first at-stopping inter-vehicle distance $D\beta_1$. Accordingly, even when the host vehicle α is stopped at the basic stop position $P\alpha_0$, the above space is further widened in a relatively wide state, and thus the following vehicle γ can be encouraged to enter the space. As a result, traffic efficiency can be improved by promoting the following vehicle γ to cross the crossing lane Ct.

Fifth Embodiment

Hereinafter, a fifth embodiment will be described. The same elements as those in the first to fourth embodiments are denoted by the same reference numerals, and the description thereof will be omitted. In the present embodiment, a control mode in which, based on the autonomous driving control method according to the second embodiment described with reference to FIG. 5, switching of a priority related to passage in the crossing lane Ct is further determined, and the at-stopping inter-vehicle distance Dβ is set according to a determination result will be described.

Figure 8:
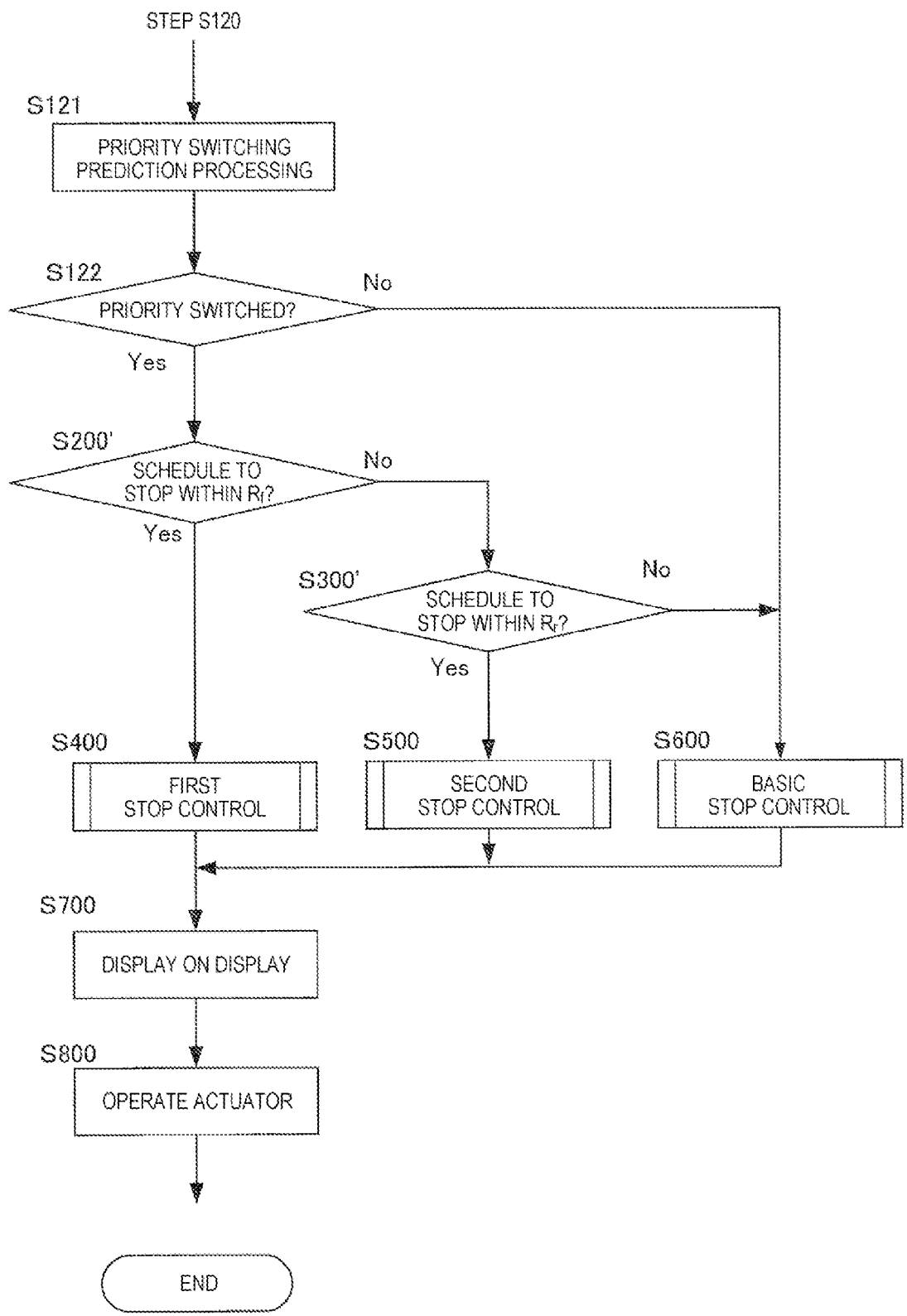
FIG. 8 is a flowchart illustrating an autonomous driving control method according to a fifth embodiment.

FIG. 8 is a flowchart illustrating an autonomous driving control method according to the present embodiment. For simplification of the drawings, blocks of step S100, step S115, and step S120, which are common to those in FIG. 5, are not illustrated.

In particular, in the present embodiment, in step S121, the controller 20 executes priority switching processing of predicting switching of a priority in traveling in the crossing lane Ct. Specifically, the controller 20 predicts whether a traveling priority of the preceding vehicle β, the host vehicle α, and the following vehicle γ in the traveling lane L1 is switched to the crossing traveling lane L2 (in particular, whether the traveling priority in the traveling lane L1 is lost) by using a surrounding image, vehicle-to-vehicle communication information, and/or road-to-vehicle communication information as input information.

More specifically, the controller 20 calculates a prediction time until signal display in the traveling lane L1 of the host vehicle α is switched from a traffic permission display (green light) to a traffic prohibition display (red light) (hereinafter also referred to as a "priority switching prediction time").

Figure 9:
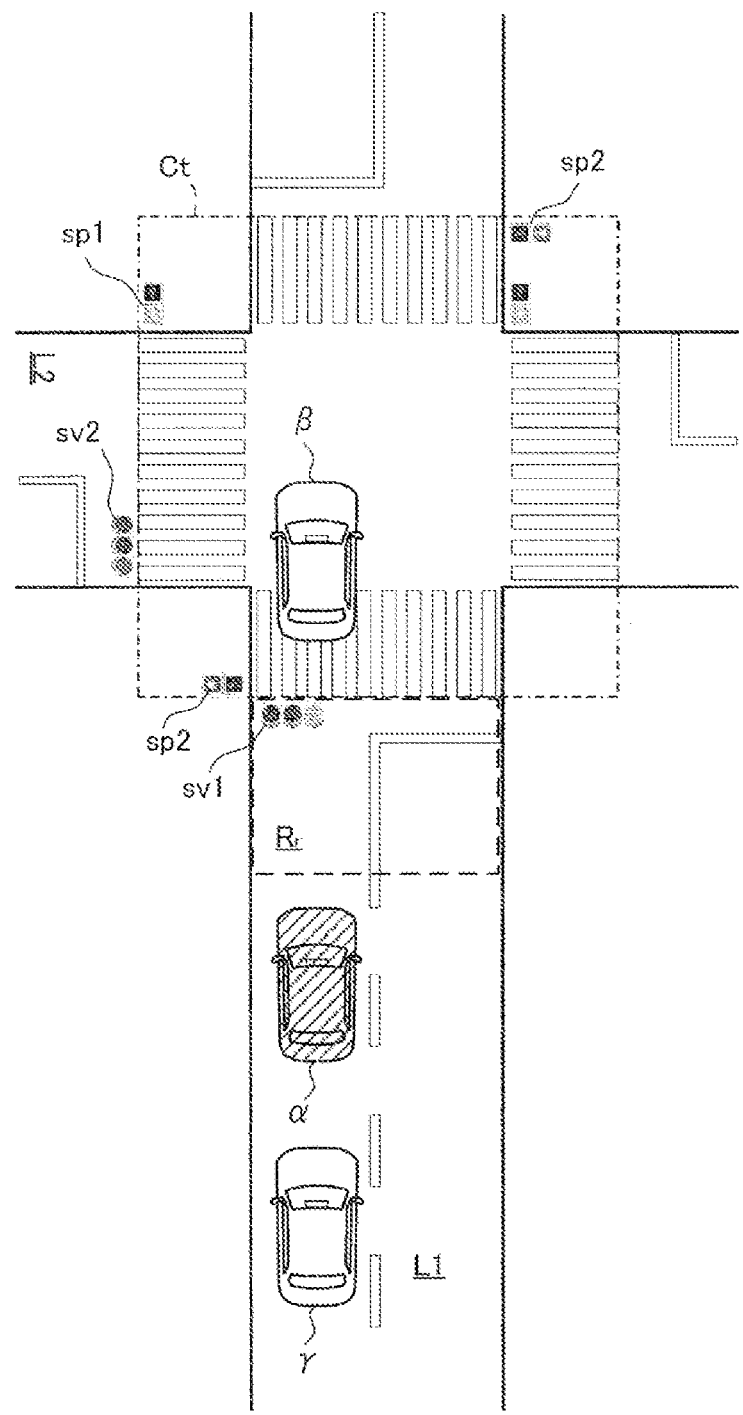
FIG. 9 is a diagram illustrating an example of a specific scene in which execution of priority switching processing is assumed.

FIG. 9 is a diagram illustrating an example of a specific scene in which execution of the priority switching processing is assumed. As illustrated, the controller 20 obtains, from the input information, each display (for example, turn-on or turn-off states of red, yellow, and green light) of a vehicle traffic light sv1 for displaying traveling permission or non-permission in the traveling lane L1 of the host vehicle α, a vehicle traffic light sv2 for displaying traveling permission or non-permission in the crossing traveling lane L2, a pedestrian traffic light sp1 for displaying traveling permission or non-permission in a crosswalk along the traveling lane L1, and a pedestrian traffic light sp2 for displaying traveling permission or non-permission in a crosswalk along the crossing traveling lane L2, and/or a switching pattern of these displays to calculate the priority switching prediction time.

Next, in step S122, the controller 20 determines whether the priority is switched. Specifically, the controller 20 determines that the priority is switched when the priority switching prediction time calculated in step S122 is equal to or less than a predetermined time threshold, and determines that the priority is not switched when the priority switching prediction time exceeds the time threshold. The time threshold is set to, when the basic scheduled stop position $P^{\wedge}\alpha_0$ of the host vehicle α is within the forward stop limit area $R_f$ or the rearward stop limit area $R_r$, an appropriate time from a viewpoint of determining whether a timing at which the traveling priority in the traveling lane L1 in the traveling lane L1 (that is, the traveling lane L1 of the preceding vehicle β and the following vehicle γ) is lost is approaching to the extent that an actual possibility that the preceding vehicle β or the following vehicle γ is left in the crossing lane Ct is assumed.

Then, when it is determined that the priority is switched, the controller 20 executes subsequent processing from step S200' in the same manner as in the second embodiment, and switches the at-stopping inter-vehicle distance Dβ to the first at-stopping inter-vehicle distance $D\beta_1$ or the second at-stopping inter-vehicle distance $D\beta_2$. On the other hand, when it is determined that the priority is not switched, the controller 20 executes basic stop control. That is, in this case, it is determined that the preceding vehicle β or the following vehicle γ is not left in the crossing lane Ct, and the at-stopping inter-vehicle distance Dβ is maintained at the basic at-stopping inter-vehicle distance $D\beta_0$.

According to the autonomous driving control method of the present embodiment having the configuration described above, the following operations and effects are exerted.

In the autonomous driving control method according to the present embodiment, whether the detected priority in the crossing lane Ct is switched is determined (step S122), and when it is determined that the priority is not switched, the at-stopping inter-vehicle distance Dβ is maintained at the basic at-stopping inter-vehicle distance $D\beta_0$ (No in step S122, and step S600).

Accordingly, control of changing the stop position Pα of the host vehicle α to the first corrected stop position Pa1 in front of the basic stop position $P\alpha_0$ or the second corrected stop position $P\alpha_2$ behind the basic stop position $P\alpha_0$ can be limited and executed in a situation in which the following vehicle γ or the preceding vehicle β is left in the crossing lane Ct (situation in which the traveling priority in the traveling lane L1 is lost within the priority switching prediction time). Therefore, specific control logic that can suppress a situation in which the stop position Pα of the host vehicle α is unnecessarily changed from the originally desired basic stop position $P\alpha_0$ is achieved.

A configuration may be adopted in which the priority switching prediction time is calculated by referring to a behavior of other vehicles and/or pedestrians present inside or around the crossing lane Ct (such as a start timing of the vehicle and a crossing start timing of the pedestrian) instead of or in addition to each display (for example, turn-on or turn-off states of red, yellow, and green light) of the vehicle traffic light sv1, the vehicle traffic light sv2, the pedestrian traffic light sp1, and/or the pedestrian traffic light sp2 in the present embodiment.

Sixth Embodiment

Hereinafter, a sixth embodiment will be described. The same elements as those in the first to fifth embodiments are denoted by the same reference numerals, and the description thereof will be omitted.

In the present embodiment, the controller 20 determines a magnitude of the first at-stopping inter-vehicle distance $D\beta_1$, a magnitude of the second at-stopping inter-vehicle distance $D\beta_2$, or both based on the number of vehicles present in the crossing lane Ct.

More specifically, during first stop control, the controller 20 calculates the number of vehicles present in the crossing lane Ct based on a surrounding image, vehicle-to-vehicle communication information, and/or road-to-vehicle communication information. In the present embodiment, the vehicles in the crossing lane Ct to be detected include other vehicles other than the preceding vehicle β or the following vehicle γ (other vehicles further preceding the preceding vehicle β or other vehicles further following the following vehicle γ). Then, the controller 20 determines the first at-stopping inter-vehicle distance $D\beta_1$ according to the number of vehicles calculated by referring to a predetermined map. Similarly, the controller 20 determines the second at-stopping inter-vehicle distance $D\beta_2$ according to the number of vehicles present in the crossing lane Ct during second stop control.

Figure 10:
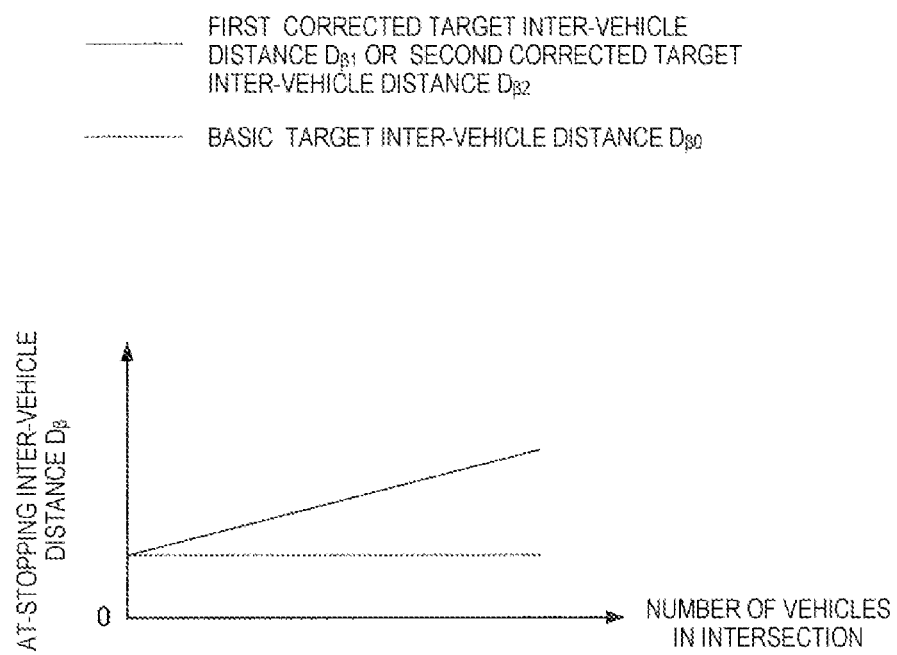
FIG. 10 is a diagram illustrating an example of a map for defining a relationship between the number of vehicles in an intersection and a correction target inter-vehicle distance to be set in an autonomous driving control method according to a sixth embodiment.

FIG. 10 is a diagram illustrating an example of a map for defining a relationship between the number of vehicles present in the crossing lane Ct and the first at-stopping inter-vehicle distance $D\beta_1$ (second at-stopping inter-vehicle distance $D\beta_2$) to be set. As illustrated, in the present embodiment, the first at-stopping inter-vehicle distance $D\beta_1$ (second at-stopping inter-vehicle distance $D\beta_2$) is set to be longer than the basic at-stopping inter-vehicle distance $D\beta_0$ as the number of vehicles present in the crossing lane Ct increases.

As described above, in the present embodiment, at least one of the first at-stopping inter-vehicle distance $D\beta_1$ and the second at-stopping inter-vehicle distance $D\beta_2$ is determined based on the number of vehicles present in the crossing lane Ct.

Accordingly, an amount of changing the stop position Pα of the host vehicle α from the basic stop position $P\alpha_0$ can be determined according to the number of other vehicles that may be actually left in the crossing lane Ct. Accordingly, a deviation width of the actual stop position Pα with respect to the basic stop position $P\alpha_0$ which is originally intended can be appropriately reduced depending on the situation while preventing the preceding vehicle β or the following vehicle γ from being left in the crossing lane Ct.

FIG. 10 illustrates an example in which the magnitudes of the first at-stopping inter-vehicle distance $D\beta_1$ and the second at-stopping inter-vehicle distance $D\beta_2$ when the number of vehicles present in the crossing lane Ct is the same are set to be the same. However, the present invention is not limited thereto, and a mode in which the magnitudes of the first at-stopping inter-vehicle distance $D\beta_1$ and the second at-stopping inter-vehicle distance $D\beta_2$ with respect to the number of vehicles present in the crossing lane Ct differ from each other may be adopted depending on the situation.

Seventh Embodiment

Hereinafter, a seventh embodiment will be described. The same elements as those in the first to sixth embodiments are denoted by the same reference numerals, and the description thereof will be omitted. In the present embodiment, an example of control of defining a timing at which the at-stopping inter-vehicle distance Dβ is returned to the basic at-stopping inter-vehicle distance $D\beta_0$ when the at-stopping inter-vehicle distance Dβ is set to the first at-stopping inter-vehicle distance $D\beta_1$ or the second at-stopping inter-vehicle distance $D\beta_2$ and the host vehicle α is stopped will be described.

Figure 11:
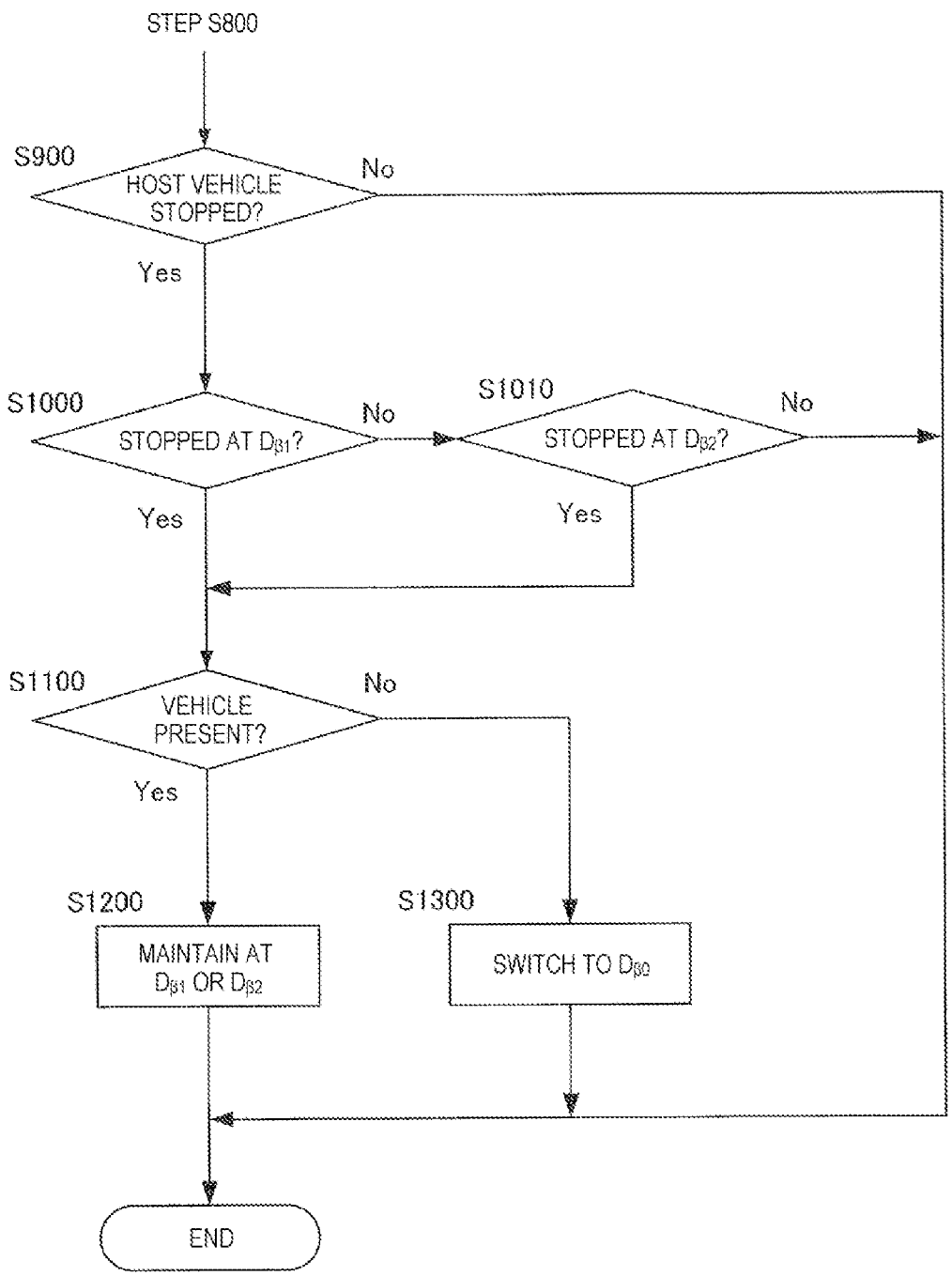
FIG. 11 is a flowchart illustrating an autonomous driving control method according to a seventh embodiment.

FIG. 11 is a flowchart illustrating an autonomous driving control method according to the present embodiment. For simplification of the drawings, blocks up to step S800, which are common to those in FIG. 2, 5, 6, or 8, are not illustrated. That is, each processing illustrated in FIG. 11 is started after the processing in step S800.

First, in step S900, the controller 20 determines whether the host vehicle α is stopped based on the host vehicle speed Vα or the like. Then, when it is determined that the host vehicle α is not stopped, the controller 20 ends this routine, and when it is determined that the host vehicle α is stopped, the controller 20 executes determination in step S1000 and step S1010.

In steps S1000 and S1010, the controller 20 determines whether the at-stopping inter-vehicle distance Dβ is set to the first at-stopping inter-vehicle distance $D\beta_1$ or the second at-stopping inter-vehicle distance $D\beta_2$. Then, when it is determined that the at-stopping inter-vehicle distance Dβ is set to neither the first at-stopping inter-vehicle distance $D\beta_1$ nor the second at-stopping inter-vehicle distance $D\beta_2$ (that is, is set to the basic at-stopping inter-vehicle distance $D\beta_0$), the controller 20 ends this routine. On the other hand, when it is determined that the at-stopping inter-vehicle distance Dβ is set to the first at-stopping inter-vehicle distance $D\beta_1$ or the second at-stopping inter-vehicle distance $D\beta_2$, the controller 20 executes processing in step S1100.

In step S1100, the controller 20 determines whether a vehicle is present in the crossing lane Ct by referring to a surrounding image, surrounding vehicle detection data, and/or vehicle-to-vehicle communication information. In the present embodiment, the vehicles in the crossing lane Ct to be detected include other vehicles other than the preceding vehicle β or the following vehicle γ (other vehicles further preceding the preceding vehicle β or other vehicles further following the following vehicle γ).

Then, when it is determined that a vehicle is present in the crossing lane Ct, the controller 20 maintains the at-stopping inter-vehicle distance Dβ at the first at-stopping inter-vehicle distance $Dβ_1$ or the second at-stopping inter-vehicle distance $Dβ_2$ in step S1200. On the other hand, when it is determined that no vehicle is present in the crossing lane Ct, the controller switches the at-stopping inter-vehicle distance Dβ from the first at-stopping inter-vehicle distance $Dβ_1$ or the second at-stopping inter-vehicle distance $Dβ_2$ to the basic at-stopping inter-vehicle distance $Dβ_0$.

As described above, in the present embodiment, after the host vehicle α is stopped based on the first at-stopping inter-vehicle distance $Dβ_1$ or the second at-stopping inter-vehicle distance $Dβ_2$ (Yes in step S900), a state where the at-stopping inter-vehicle distance Dβ is set to the first at-stopping inter-vehicle distance $Dβ_1$ or the second at-stopping inter-vehicle distance $Dβ_2$ is maintained until it is determined that no vehicle is present in the crossing lane Ct (step S1100 to step S1300).

Accordingly, when the stop position Pα of the host vehicle α is the first corrected stop position $Pα_1$ or the second corrected stop position $Pα_2$ deviated from the basic stop position $Pα_0$, the stop position Pα is maintained until no vehicle is present in the crossing lane Ct. That is, while the situation in which a vehicle that may be left in the crossing lane Ct is present continues, a state where a space for retracting the following vehicle γ or the preceding vehicle β from the crossing lane Ct is formed can be maintained. Therefore, the following vehicle γ or the preceding vehicle β can be more reliably prevented from being left in the crossing lane Ct.

According to the autonomous driving control method of the present embodiment, even when the preceding vehicle β moves while the host vehicle α is stopped, the host vehicle α moves following the preceding vehicle β so as to maintain the first corrected stop position $Pα_1$ or the second corrected stop position $Pα_2$. That is, the host vehicle α follows the preceding vehicle β so as to maintain a relatively short inter-vehicle distance (first at-stopping inter-vehicle distance $Dβ_1$) or a relatively long inter-vehicle distance (second at-stopping inter-vehicle distance $Dβ_2$) with respect to the preceding vehicle β. Therefore, an intention of the host vehicle α for making a space, for the following vehicle γ or the preceding vehicle β to retreat from the crossing lane Ct, for the preceding vehicle β or the following vehicle γ can be more reliably recognized. As a result, cooperation (retracting of the following vehicle γ or advancing of the preceding vehicle β) for making the space by the preceding vehicle β or the following vehicle γ can be promoted, and the following vehicle γ or the preceding vehicle β can be more reliably prevented from being left in the crossing lane Ct.

[Modification 1]

Figure 12A:
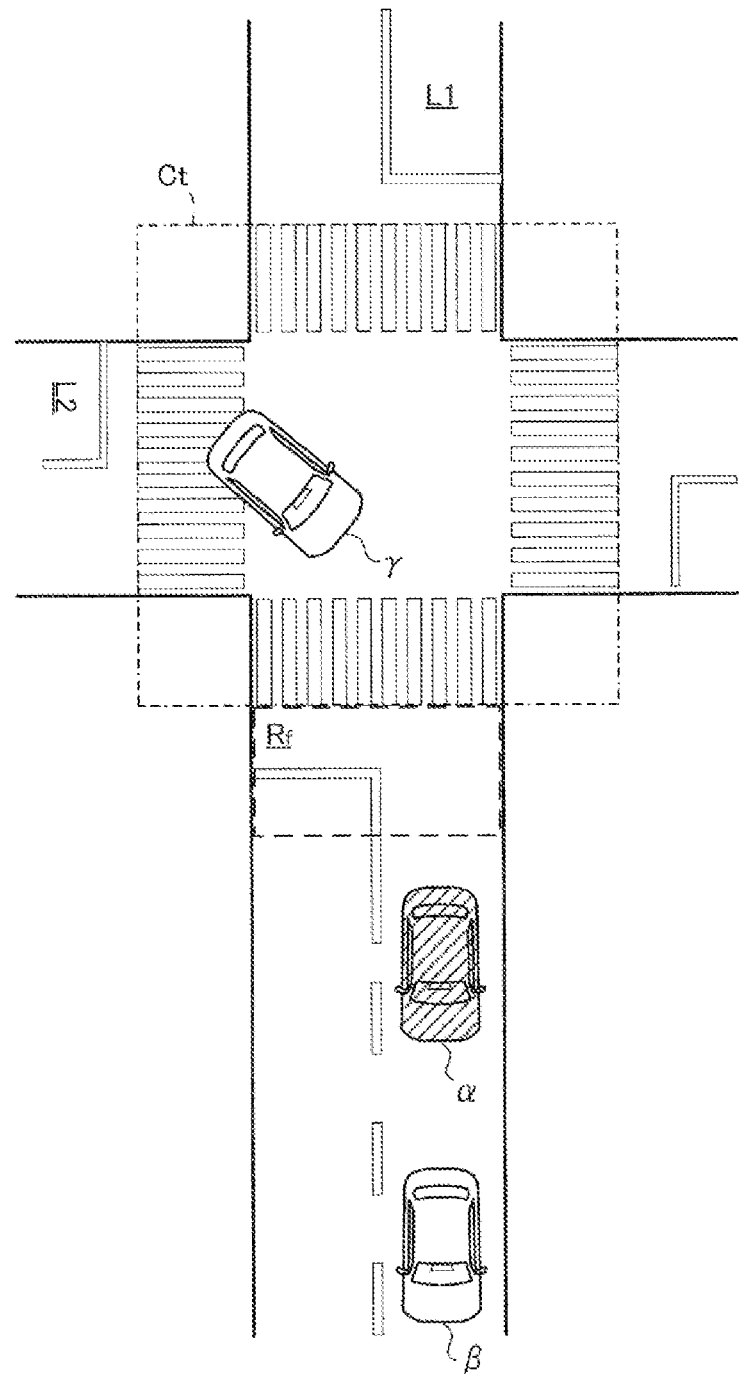
FIG. 12A is a diagram illustrating modification 1.

FIG. 12A is a diagram illustrating a modification of a scene to which the autonomous driving control method can be applied. In the above embodiments, the examples in which the autonomous driving control methods (in particular, first stop control) according to the embodiments are applied in a scene in which both the host vehicle α and the following vehicle γ are traveling straight in the same traveling lane L1 (see FIG. 4) are described, but as illustrated in FIG. 12A, the autonomous driving control methods according to the embodiments may be applied when the following vehicle γ turns right from the crossing traveling lane L2 toward the traveling lane L1 in the crossing lane Ct.

Although not illustrated, the autonomous driving control method (in particular, second stop control) according to the embodiments may be applied when the preceding vehicle β turns right from the crossing traveling lane L2 toward the traveling lane L1 in the crossing lane Ct.

[Modification 2]

Figure 12B:
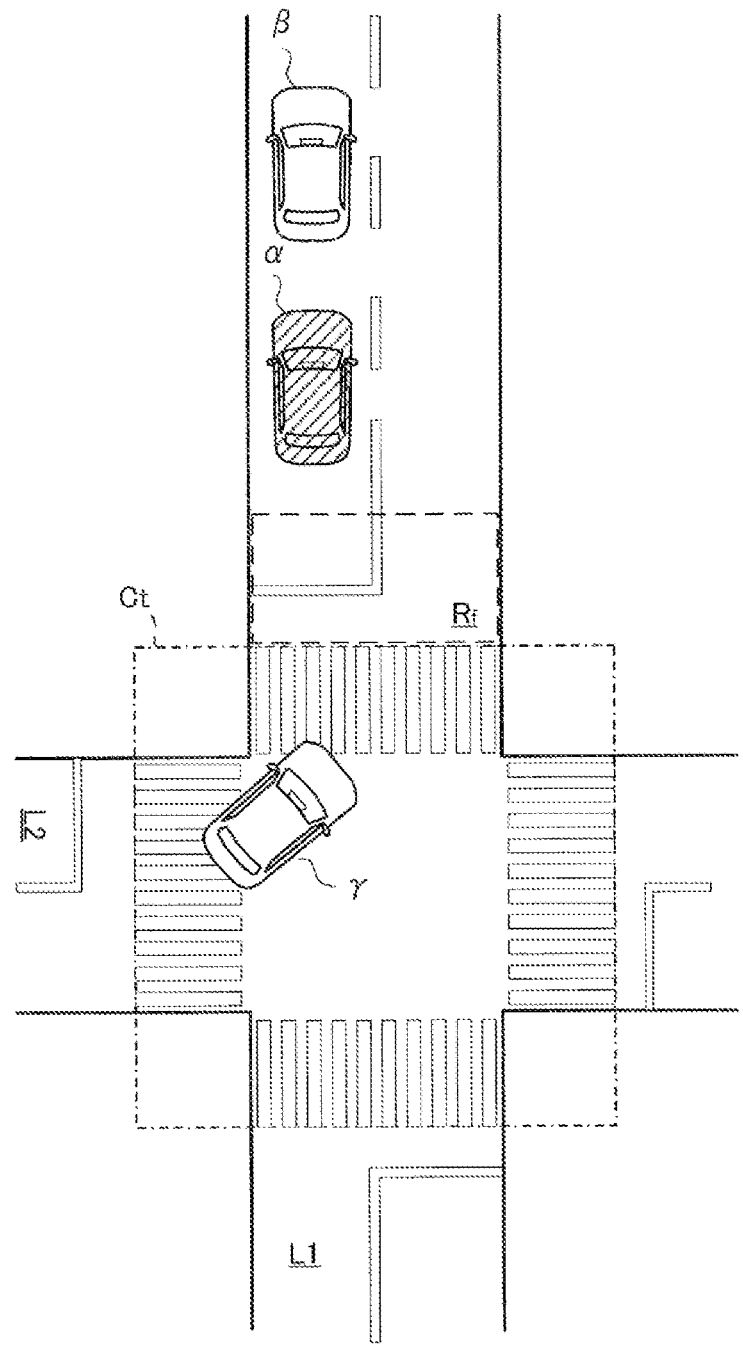
FIG. 12B is a diagram illustrating modification 2.

FIG. 12B is a diagram illustrating a modification of a scene to which the autonomous driving control method can be applied. As illustrated, the autonomous driving control methods according to the embodiments may be applied when the following vehicle γ turns left from the crossing traveling lane L2 toward the traveling lane L1 in the crossing lane Ct. In addition, although not illustrated, the autonomous driving control methods according to the embodiments may be applied when the preceding vehicle β turns left in the crossing lane Ct.

[Modification 3]

Figure 12C:
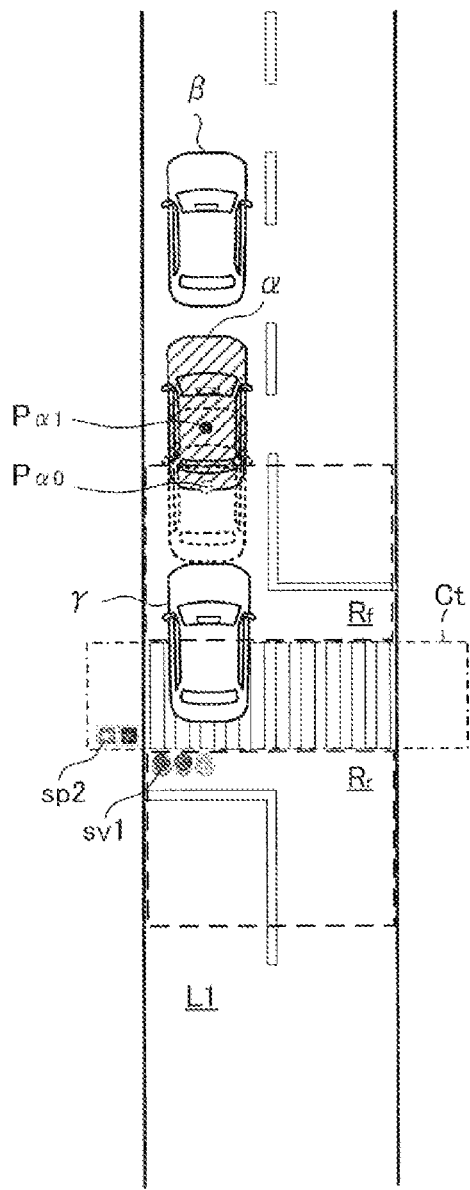
FIG. 12C is a diagram illustrating modification 3.

FIG. 12C is a diagram illustrating a modification of a scene to which the autonomous driving control method can be applied. As illustrated, the autonomous driving control methods according to the embodiments may be applied when the crossing lane Ct includes the traveling lane L1 of the host vehicle α, a sidewalk intersecting with the traveling lane L1, and traffic lights (vehicle traffic light sv1 and pedestrian traffic light sp2) (when the crossing traveling lane L2 is not present).

[Modification 4]

Figure 12D:
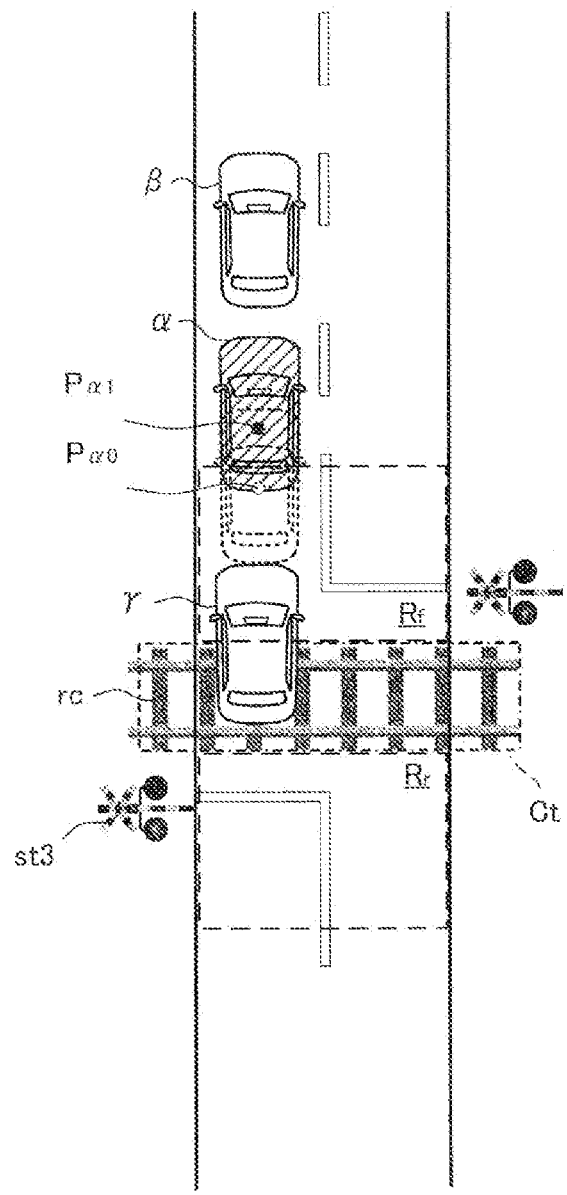
FIG. 12D is a diagram illustrating modification 4.

FIG. 12D is a diagram illustrating a modification of a scene to which the autonomous driving control method can be applied. As illustrated, the autonomous driving control methods according to the embodiments may be applied when the crossing lane Ct includes the traveling lane L1 of the host vehicle α, a line L3 intersecting with the traveling lane L1, a railroad crossing rc for determining permission or non-permission of passage in the traveling lane L1, and traffic lights (vehicle traffic light sv1 and railroad crossing traffic light st3).

In particular, in the scene of the present modification, when the autonomous driving control method according to the fifth embodiment (FIG. 8) is applied, a configuration in which the priority switching prediction time is calculated based on each display of the vehicle traffic light sv1 and/or the railroad crossing traffic light st3 may be adopted. On the other hand, in the present modification, from a viewpoint of more reliably preventing the vehicle from being left in the railroad crossing rc, it is preferable to apply control logic that executes processing from step S200 (that is, control logic described with reference to FIG. 2 or 5) without executing processing (step S111 and step S112) related to the priority switching determination illustrated in FIG. 8.

Although the embodiments of the present invention have been described, the above embodiments are merely a part of application examples of the present invention, and do not mean that the technical scope of the present invention is limited to the specific configurations of the above embodiments.

For example, in the above embodiments, an autonomous driving control method that adopts both control in which the possibility that the following vehicle γ is left in the crossing lane Ct is assumed (for example, determination in step S200 and first stop control in step S400 in FIG. 2) and control in which the possibility that the preceding vehicle β is left in the crossing lane Ct is assumed (for example, determination in step S300 and second stop control in step S500 in FIG. 2) is described. However, an autonomous driving control method using only one of these control is also included in the technical scope of the present invention.

The above embodiments can be combined with each other in any combination within a range in which contradiction does not occur. For example, the control according to the third embodiment to the seventh embodiment is not limited to the control based on the autonomous driving control method according to the second embodiment, and may be performed based on the autonomous driving control method according to the first embodiment.

An autonomous driving control program for causing the controller 20, which is a computer, to execute the autonomous driving control methods described in the above embodiments and a storage medium storing the autonomous driving control program are also included in the scope of the matters described in the description at the time of filing of the present application.

The invention claimed is:

1. An autonomous driving control method for stopping a host vehicle such that an inter-vehicle distance to a preceding vehicle is a predetermined at-stopping inter-vehicle distance, the method comprising at least one of:

executing first stop control of setting an at-stopping inter-vehicle distance to a first at-stopping inter-vehicle distance shorter than a predetermined basic at-stopping inter-vehicle distance when a stop position of the host vehicle is within a forward stop limit area set in front of a crossing lane; or executing second stop control of setting the at-stopping inter-vehicle distance to a second at-stopping inter-vehicle distance longer than the predetermined basic at-stopping inter-vehicle distance when the stop position of the host vehicle is within a rearward stop limit area set behind the crossing lane, wherein the at-stopping inter-vehicle distance is set to the predetermined basic at-stopping inter-vehicle distance and the host vehicle is stopped, wherein whether the stop position of the host vehicle is within the forward stop limit area or within the rearward stop limit area, or within neither the forward stop limit area nor the rearward stop limit area is determined, wherein when it is determined that the stop position of the host vehicle is within the forward stop limit area, the first stop control is executed, wherein when it is determined that the stop position of the host vehicle is not within the rearward stop limit area, the second stop control is executed, and wherein when it is determined that the stop position of the host vehicle is within neither the forward stop limit area nor the rearward stop limit area, basic stop control of maintaining the predetermined basic at-stopping inter-vehicle distance is executed.

2. An autonomous driving control method for stopping a host vehicle such that an inter-vehicle distance to a preceding vehicle is a predetermined at-stopping inter-vehicle distance, the method comprising:

calculating a basic scheduled stop position where an at-stopping inter-vehicle distance is a basic at-stopping inter-vehicle distance; and at least one of executing first stop control of setting a scheduled stop position of the host vehicle to a first corrected stop position and stopping the host vehicle when the basic scheduled stop position is within a forward stop limit area set in front of a crossing lane, the first corrected stop position being a position where the at-stopping inter-vehicle distance being a first at-stopping inter-vehicle distance shorter than the basic at-stopping inter-vehicle distance; or executing second stop control of setting the scheduled stop position of the host vehicle to a second corrected stop position and stopping the host vehicle when the basic scheduled stop position is within a rearward stop limit area set behind the crossing lane, the second corrected stop position being a position where the at-stopping inter-vehicle distance being a second at-stopping inter-vehicle distance longer than the basic at-stopping inter-vehicle distance.

3. The autonomous driving control method according to claim 2, wherein, when it is determined that the basic scheduled stop position is within neither the forward stop limit area nor the rearward stop limit area, the method further comprises:

executing basic stop control, the basic stop control comprising setting the scheduled stop position to the basic scheduled stop position and stopping the host vehicle.

4. The autonomous driving control method according to claim 2, further comprising at least one of:

when the scheduled stop position is set to the first corrected stop position, determining whether the following vehicle is present in the crossing lane, and when it is determined that the following vehicle is not present, changing the scheduled stop position from the first corrected stop position to the basic scheduled stop position and stopping the host vehicle, even if the basic scheduled stop position is within the forward stop limit area; or when the scheduled stop position is set to the second corrected stop position, determining whether the preceding vehicle is present in the crossing lane, and when it is determined that the preceding vehicle is not present, changing the scheduled stop position from the second corrected stop position to the basic scheduled stop position and stopping the host vehicle, even if the basic scheduled stop position is within the rearward stop limit area.

5. The autonomous driving control method according to claim 2, wherein when the scheduled stop position is set to the first corrected stop position, determining whether the following vehicle is present in a predetermined distance range in front of the crossing lane, determining whether a separation distance from the host vehicle to the crossing lane behind the host vehicle exceeds a predetermined distance threshold, and when it is determined that the separation distance does not exceed the predetermined distance threshold, changing the scheduled stop position from the first corrected stop position to the basic scheduled stop position and stopping the host vehicle, even if the basic scheduled stop position is within the forward stop limit area.

6. The autonomous driving control method according to claim 2, further comprising:

determining whether a detected priority in the crossing lane is switched, and when it is determined that the detected priority is not switched, setting the scheduled stop position to the basic scheduled stop position and stopping the host vehicle, even if the basic scheduled stop position is within the forward stop limit area or within the rearward stop limit area.

7. The autonomous driving control method according to claim 2, wherein at least one of the first at-stopping inter-vehicle distance or the second at-stopping inter-vehicle distance is determined based on a number of vehicles present in the crossing lane.

8. The autonomous driving control method according to claim 2, wherein after the host vehicle is stopped based at the first corrected stop position or at the second corrected stop position, the method further comprising maintaining the host vehicle at the first corrected stop position or the second corrected stop position until it is determined that no vehicle is present in the crossing lane.

9. A device for stopping a host vehicle such that an inter-vehicle distance to a preceding vehicle is a predetermined at-stopping inter-vehicle distance, wherein the device comprises a processor and a memory storing computer-executable instructions that, when executed, cause the processor to:

calculate a basic scheduled stop position where an at-stopping inter-vehicle distance is a basic at-stopping inter-vehicle distance; and at least one of execute first stop control that sets a scheduled stop position of the host vehicle to a first corrected stop position and stops the host vehicle when the basic scheduled stop position is within a forward stop limit area set in front of a crossing lane, the first corrected stop position being a position where the at-stopping inter-vehicle distance being a first at-stopping inter-vehicle distance shorter than the basic at-stopping inter-vehicle distance; or execute second stop control that sets the scheduled stop position of the host vehicle to a second corrected stop position and stops the host vehicle when the basic scheduled stop position is within a rearward stop limit area set behind the crossing lane, the second corrected stop position being a position where the at-stopping inter-vehicle distance being a second at-stopping inter-vehicle distance longer than the basic at-stopping inter-vehicle distance.

10. An autonomous driving control method for stopping a host vehicle such that an inter-vehicle distance to a preceding vehicle is a predetermined at-stopping inter-vehicle distance, the method comprising:

stopping the host vehicle at a basic stop position where an at-stopping inter-vehicle distance being a basic at-stopping inter-vehicle distance; and at least one of executing first stop control of moving the host vehicle from the basic stop position to a first corrected stop position when the host vehicle is stopping within a forward stop limit area set in front of a crossing lane, the first corrected stop position being a position where the at-stopping inter-vehicle distance being a first at-stopping inter-vehicle distance shorter than the basic at-stopping inter-vehicle distance; or executing second stop control of moving the host vehicle from the basic stop position to a second corrected stop position when the host vehicle is stopping within a rearward stop limit area set behind the crossing lane, the second corrected stop position being a position where the at-stopping inter-vehicle distance being a second at-stopping inter-vehicle distance longer than the basic at-stopping inter-vehicle distance.

11. The autonomous driving control method according to claim 10, wherein when it is determined that the host vehicle is within neither the forward stop limit area nor the rearward stop limit area, the method further comprises executing basic stop control, the basic stop control comprising maintaining the host vehicle at the basic stop position.

12. The autonomous driving control method according to claim 10, wherein at least one of the first at-stopping inter-vehicle distance or the second at-stopping inter-vehicle distance is determined based on a number of vehicles present in the crossing lane.

13. The autonomous driving control method according to claim 10, wherein after the host vehicle is moved to the first corrected stop position or the second corrected stop position, the method further comprises maintaining the host vehicle at the first corrected stop position or the second corrected stop position until it is determined that no vehicle is present in the crossing lane.

* * * * *